US012767176B2

(12) United States Patent
Trangbaek et al.

(10) Patent No.: US 12,767,176 B2
(45) Date of Patent: Oct. 20, 2026

(54) SYSTEM AND METHOD OF LOW VELOCITY VEHICLE MANEUVERING USING A REMOTE CAMERA

(71) Applicant: GM GLOBAL TECHNOLOGY OPERATIONS LLC, Detroit, MI (US)

(72) Inventors: Klaus Trangbaek, Ein Vered (IL); Sharon Hornstein, Pardes Hanna (IL); Vladimir Suplin, Modi'in Makabim-Re'ut (IL); Aviran Sadon, Kiryat Ono (IL); Carmel Rabinovitz, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 19/043,741

(22) Filed: Feb. 3, 2025

(65) Prior Publication Data

US 2026/0225615 A1 Aug. 6, 2026

(51) Int. Cl.

| | |
|---|---|
| ***B60W 60/00*** | (2020.01) |
| ***B60W 30/09*** | (2012.01) |
| ***B60W 30/095*** | (2012.01) |
| ***B60W 50/14*** | (2020.01) |
| ***G01C 21/00*** | (2006.01) |

(Continued)

(52) U.S. Cl.

CPC ........ *B60W 60/0015* (2020.02); *B60W 30/09* (2013.01); *B60W 30/0953* (2013.01); *B60W 30/0956* (2013.01); *B60W 50/14* (2013.01); *G01C 21/3626* (2013.01);

(Continued)

(58) Field of Classification Search

CPC ............. B60W 60/0015; B60W 30/09; B60W 30/0953; B60W 30/0956; B60W 50/14; G01C 21/3626; G01C 21/3841; G01C 21/3885; G06V 20/58

See application file for complete search history.

(56) References Cited

U.S. PATENT DOCUMENTS

| | | | | |
|---|---|---|---|---|
| 10,234,868 | B2 * | 3/2019 | Lavoie | G05D 1/0285 |
| 10,745,002 | B2 * | 8/2020 | Miller | G01C 21/3602 |

(Continued)

FOREIGN PATENT DOCUMENTS

| | | | |
|---|---|---|---|
| DE | 102016211182 | A1 | 3/2017 |
| DE | 102017207810 | A1 | 11/2018 |

(Continued)

*Primary Examiner* — Tyler J Lee

(74) *Attorney, Agent, or Firm* — Ingrassia Fisher & Lorenz, LLP | IFL

(57) ABSTRACT

In an example implementation, a method includes receiving first image data of first images from at least one camera on a vehicle. The first images include a view of at least one area to be moved into by the vehicle or a trailer hitched to the vehicle. The method includes receiving second image data of second images from at least one camera on a remote device. The second images include a view of at least part of the area. The method includes generating a digital map of the area using the first and second image data, and generating path data of a projected path of the vehicle at least partially through the area on the digital map and by using the 3D map to display a view of the projected path on the remote device. The method includes receiving autonomous driving instructions by use of a graphical user interface associated with the display, and executing the instructions.

19 Claims, 12 Drawing Sheets

(51) Int. Cl.
*G01C 21/36* (2006.01)
*G06V 20/58* (2022.01)

(52) U.S. Cl.
CPC ..... *G01C 21/3841* (2020.08); *G01C 21/3885* (2020.08); *G06V 20/58* (2022.01); *B60W 2050/146* (2013.01)

(56) References Cited

U.S. PATENT DOCUMENTS

| | | | | |
|---|---|---|---|---|
| 11,936,700 | B1 | 3/2024 | Bai et al. | |
| 12,010,461 | B2 | 6/2024 | Anderson et al. | |
| 12,126,897 | B2 | 10/2024 | Li et al. | |
| 12,474,717 | B2 * | 11/2025 | Iwahori | G05B 19/41895 |
| 2017/0253237 | A1 * | 9/2017 | Diessner | G05D 1/0221 |
| 2018/0029591 | A1 * | 2/2018 | Lavoie | B60W 50/14 |
| 2018/0364737 | A1 * | 12/2018 | Lavoie | B62D 15/0285 |
| 2019/0220001 | A1 * | 7/2019 | Lavoie | G05D 1/005 |
| 2020/0207333 | A1 * | 7/2020 | Miller | G01C 21/3602 |
| 2020/0307555 | A1 * | 10/2020 | Van Wiemeersch | B60W 30/06 |
| 2021/0291832 | A1 * | 9/2021 | Simmons | B60K 35/28 |
| 2021/0341929 | A1 * | 11/2021 | Gali | B60R 1/06 |
| 2021/0403055 | A1 * | 12/2021 | Jeromin | H04W 4/024 |
| 2023/0324197 | A1 * | 10/2023 | Kleen | G01C 21/3638 |
| 2024/0233320 | A1 | 7/2024 | Li et al. | |
| 2024/0280998 | A1 * | 8/2024 | Iwahori | G05D 1/225 |
| 2024/0282008 | A1 | 8/2024 | Li et al. | |
| 2024/0282114 | A1 | 8/2024 | Li et al. | |

FOREIGN PATENT DOCUMENTS

| | | | |
|---|---|---|---|
| DE | 102019220048 | A1 | 7/2020 |
| DE | 102021106153 | A1 | 9/2021 |
| DE | 102019106520 | B4 | 11/2023 |

* cited by examiner

SYSTEM AND METHOD OF LOW VELOCITY VEHICLE MANEUVERING USING A REMOTE CAMERA

INTRODUCTION

The present disclosure relates to vehicles with autonomous driving features, and more particularly, low velocity vehicle maneuvering using cameras.

Many modern vehicles have at least some aspects of autonomous driving, such as automatic acceleration, steering, and brake control. An autonomous system on the vehicle can control the vehicle by using computer vision that uses cameras on the vehicle to capture images of the environment around the vehicle so that the autonomous system can understand the vehicle's surroundings. It is desirable to capture images of more of the environment near the vehicle for autonomous driving including backing a trailer hitched to the vehicle into a desired location.

BRIEF SUMMARY

In an example implementation, a method includes receiving first image data of first images from at least one camera on a vehicle. The first images include a view of at least one area to be moved into by the vehicle or a trailer hitched to the vehicle. The method includes receiving second image data of second images from at least one camera on a remote device remote from the vehicle. The second images include a view of at least part of the area. The method includes generating, by at least one processor, a digital map of the area including using both the first image data and the second image data, and generating, by at least one processor, path data of a projected path of the vehicle or the trailer at least partially through the area on the digital map. The path data is arranged to be used to display a view of the projected path on the remote device. The method includes receiving, by at least one processor on the vehicle, autonomous driving instructions by use of a graphical user interface associated with the display, and executing, by at least one processor on the vehicle, the instructions to autonomously drive the vehicle along the projected path.

Also in accordance with another example implementation, the generating of both the digital map and the path data is performed at the vehicle, and the at least one processor generating the digital map at the vehicle receives at least raw image data from the remote device.

Also in accordance with another example implementation, the digital map is a 3D map. The generating of both the 3D map and the path data is performed at the vehicle, and the at least one processor generating the 3D map at the vehicle receives at least remotely-generated 3D map data of the part of the area in the second image data.

Also in accordance with another example implementation, the generating of both the digital map and the path data is performed at the vehicle, and the at least one processor generating the digital map at the vehicle receives remotely-generated data of identification of features extracted or objects recognized or both in the part of the area in the second image data.

Also in accordance with another example implementation, the method includes transmitting the first image data to the remote device, and the generating of the digital map is performed at the remote device.

Also in accordance with another example implementation, the generating of the path data is performed at the remote device.

Also in accordance with another example implementation, the method includes transmitting the first and second image data to a remote system that is remote from both the remote device and the vehicle. The generating of the digital map is performed at the remote system.

Also in accordance with another example implementation, the generating of the path data is performed at the remote system.

Also in accordance with another example implementation, the generating of the path data is performed on the vehicle. The remote device is a smartphone or a tablet, and the remote system is a server.

Also in accordance with another example implementation, the generating of the path data is performed on the remote device.

In an example implementation, a system includes a vehicle having memory and processor circuitry forming at least one processor at the vehicle and being communicatively coupled to the memory. The at least one processor is arranged to operate by receiving first image data of first images from at least one camera on the vehicle. The first images include a view of at least one area to be moved into by the vehicle or a trailer hitched to the vehicle. The at least one processor is arranged to operate by receiving second image data of second images from at least one camera on a remote device remote from the vehicle. The second images include a view of at least part of the area. The at least one processor is arranged to operate by generating a digital map of the area including using both the first image data and the second image data. The at least one processor is arranged to operate by generating path data of a projected path of the vehicle or the trailer at least partially through the area on the digital map, and generating augmented views of the area of the digital map with a view of the projected path. The at least one processor is arranged to operate by receiving autonomous driving instructions by use of a graphical user interface associated with a display showing the augmented views, and executing the instructions to autonomously move the vehicle or trailer along the projected path.

Also in accordance with another example implementation, the at least one processor is arranged to operate by transmitting the augmented views to the remote device. The display is on the remote device.

Also in accordance with another example implementation, the at least one processor is arranged to operate by receiving the autonomous driving instructions and identification of obstacles in response to transmitting the augmented views.

Also in accordance with another example implementation, the at least one processor is arranged to operate by transmitting an inquiry to the remote device to at least one of: identify a potential obstacle indicated in the augmented views, and whether to include an area that was previously occluded, and transmitting instructions to change the view on the remote device when the digital map is deemed to be insufficient.

Also in accordance with another example implementation, the at least one processor is arranged to operate by determining a location of the remote device relative to the vehicle by using a location signal from at last one of: (1) a key fob of the vehicle and in possession of a user of the remote device or (2) the remote device having an application that acts as a key fob of the vehicle.

In an example implementation, a vehicle includes one or more controllers that include memory and processor circuitry forming at least one processor communicatively coupled to the memory. The at least one processor is arranged to operate by receiving first image data of first images from at least one camera on the vehicle. The first images include a view of at least one area to be moved into by the vehicle or a trailer hitched to the vehicle. The at least one processor is to operate by receiving second image data of second images from at least one camera on a remote device remote from the vehicle. The second images include a view of at least part of the area. The at least one processor is to operate by generating a digital map of the area including using both the first image data and the second image data, and generating path data of a projected path of the vehicle or the trailer at least partially through the area on the digital map and by using the digital map to display a view of the projected path on the remote device. The at least one processor is to operate by receiving autonomous driving instructions by use of a graphical user interface associated with the display, and executing the instructions to autonomously drive the vehicle along the path.

Also in accordance with another example implementation, the at least one processor is arranged to operate by receiving sensor data from non-camera sensors of the vehicle to generate the digital map.

Also in accordance with another example implementation, the remote device has at least one light, and the at least one processor is arranged to operate by transmitting a signal to the remote device to cause the remote device to activate the at least one light while the first images are being captured, and using one or more of the first images showing the light to locate the remote device to generate the digital map.

Also in accordance with another example implementation, the vehicle has at least one light, and the at least one processor is arranged to operate by activating the at least one light when the remote device is capturing the second images, and using the second images showing the at least one light to locate the remote device relative to a location of the vehicle to generate the digital map.

Also in accordance with another example implementation, the vehicle has a trailer hitched to the vehicle and having at least one light, and the at least one processor is arranged to activate the at least one light when the remote device is capturing the second images.

BRIEF DESCRIPTION OF THE DRAWINGS

The present disclosure will hereinafter be described in conjunction with the following figures. The figures are not to scale and numerals in the figures denote like elements, and where.

DETAILED DESCRIPTION

The following detailed description merely presents example implementations and is not intended to limit the disclosure or the application and uses thereof. Furthermore, no intention exists to be bound by any theory presented in the preceding background or the following detailed description.

Figure 1:
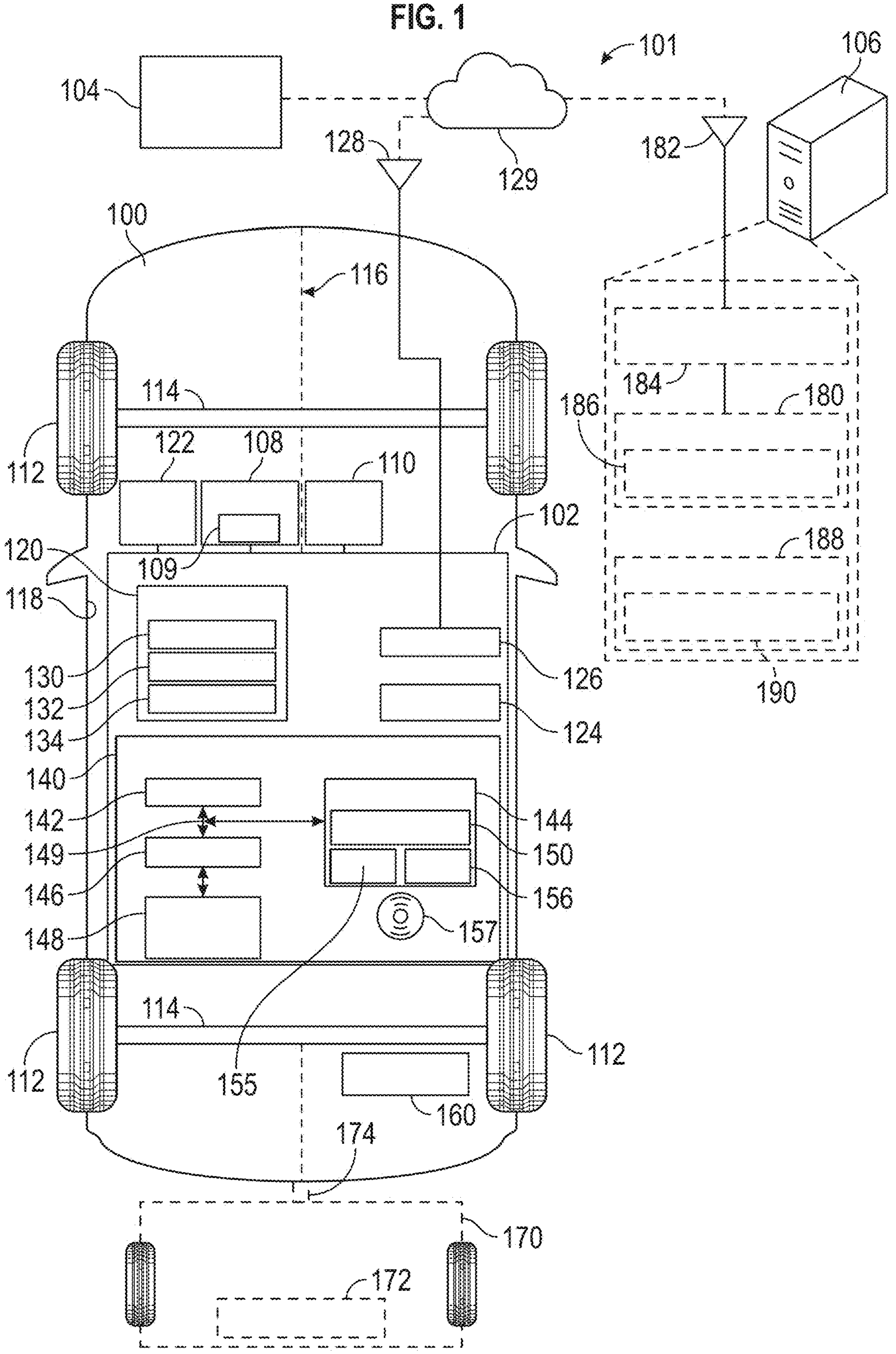
FIG. 1 is a schematic diagram of an example system of low velocity vehicle maneuvering using a remote device according to at least one of the implementations herein.
Figure 13:
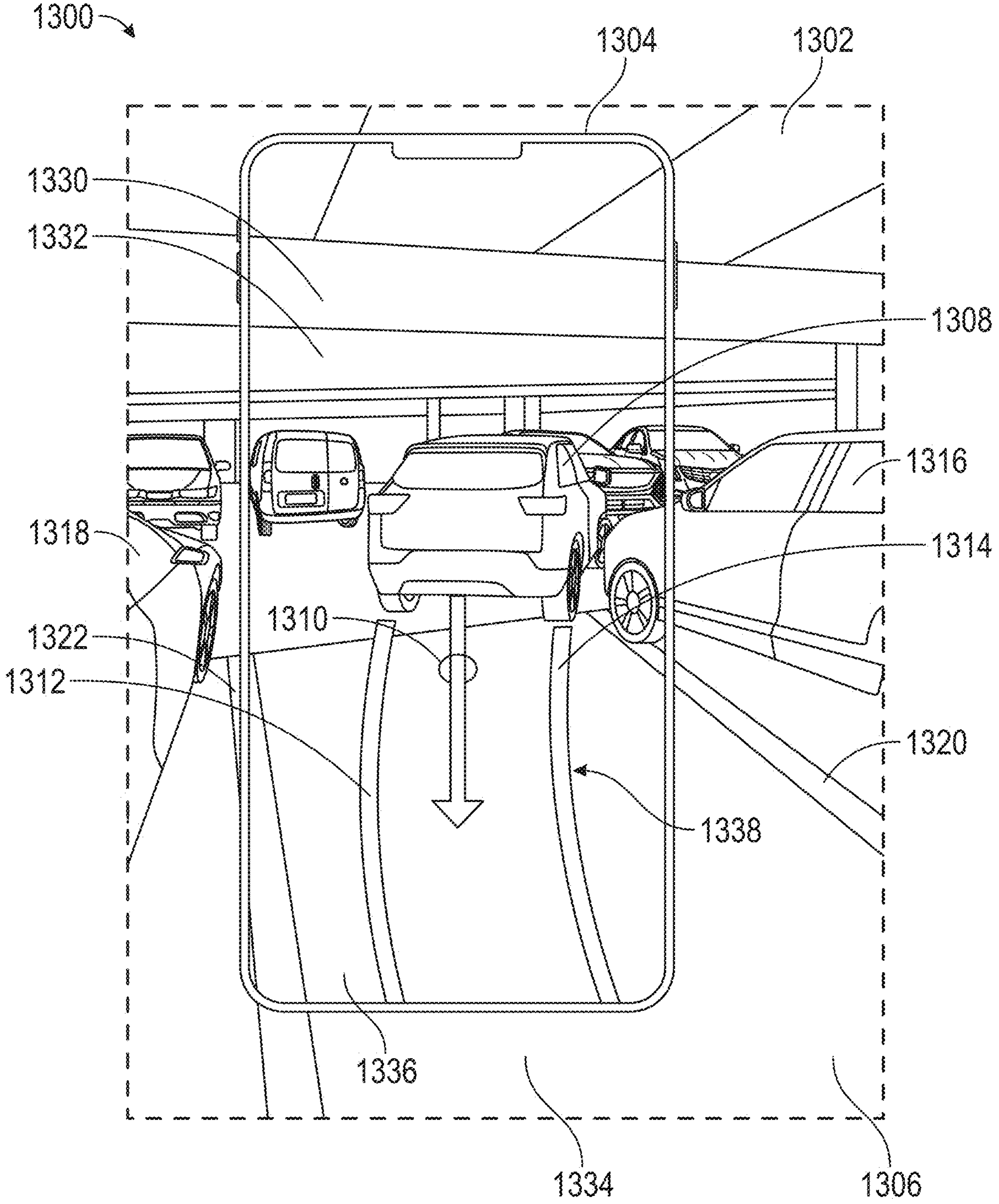
FIG. 13 is a schematic diagram of a perspective view of a vehicle maneuvering setup showing a perspective from a remote device according to at least one of the implementations herein.
Figure 14:
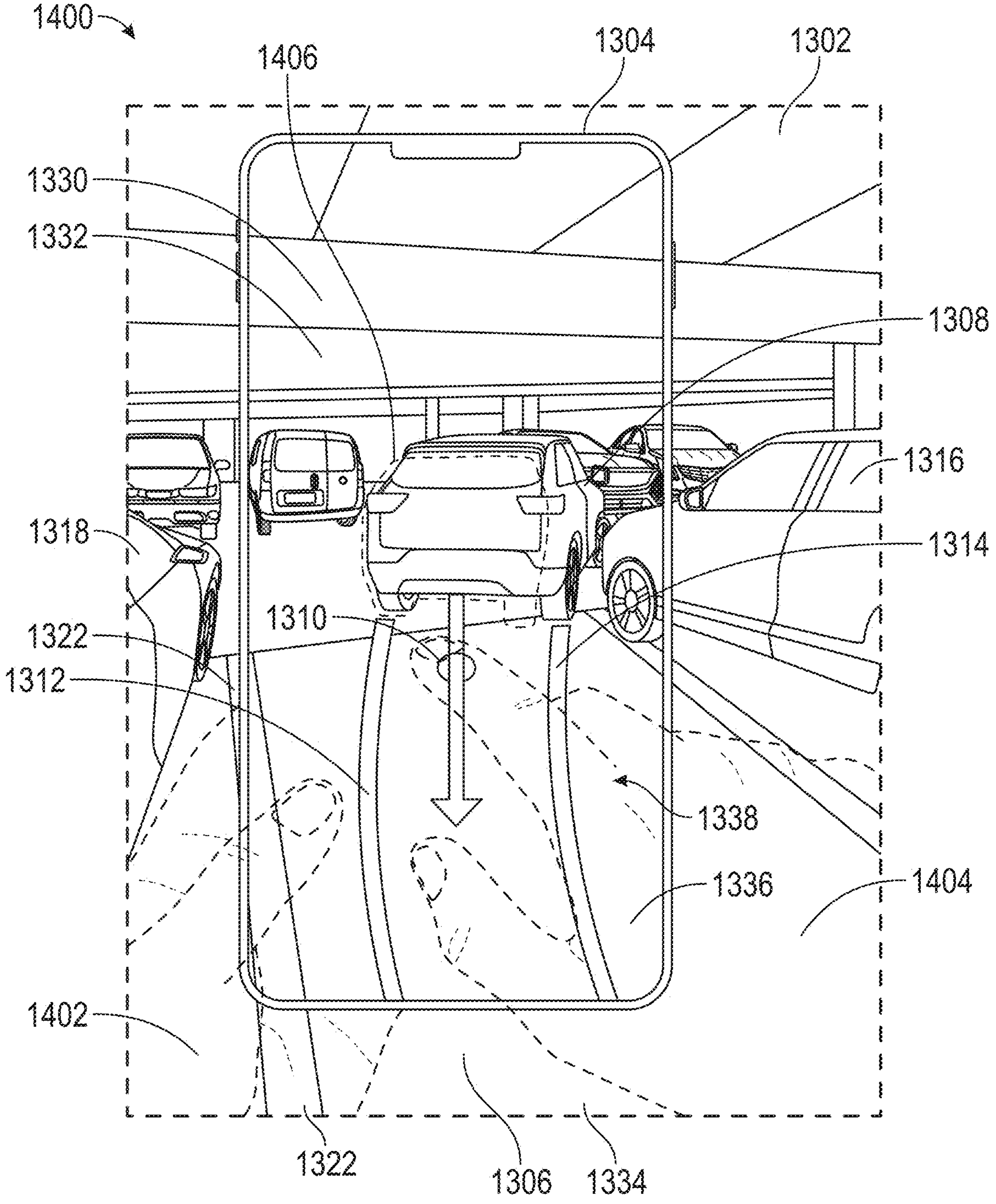
FIG. 14 is a schematic diagram of the perspective view of FIG. 13 adding a user of the remote device according to at least one of the implementations herein.

Referring to FIG. 1, a system 101 includes one or more vehicles 100 each to perform autonomous low velocity maneuvering of a vehicle and/or trailer hitched to the vehicle along a projected path (also referred to as a target path or predicted path), such as into a parking space in a parking lot to name one possible example. An example of a projected path for any of the projected paths mentioned herein is shown in FIGS. 13-14 and described below. As one particular example, the methods and systems disclosed herein provide autonomous movement for a vehicle 100 with a trailer 170, although the methods and systems apply equally to trailer-less vehicles. These tasks are performed while also using a remote device 104 (or remote imaging or camera device) in accordance with a process 1100 (FIGS. 11A-11B) and the sub-processes and implementations thereof of FIGS. 2-10 and 12-14, in accordance with example implementations described herein. It should be noted that the term path (or route, roadway, or road) is meant in a general sense herein to include any path that will be driven over by a vehicle or trailer (where 'vehicle or trailer' includes both the vehicle and trailer herein) and including a driveway, street, parking lot, and so forth, and whether or not paved, for example.

Specifically, as described in greater detail further below, in various implementations, the vehicle 100 has a controller

140 (or computer system) with processor circuitry that forms at least one processor 142 and memory 144 that stores programs 150 including software and/or firmware that performs image processing, 3D (and/or 2D) modeling, and/or autonomous driving (or driver assistance) as described in detail below.

By one example form, the vehicle 100 is an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain implementations such as trucks with more than four wheels, and so forth. In certain implementations, the vehicle 100 may also comprise any other motorized vehicle with at least autonomous driving with accelerator, brake, and steering control, and by one other form, with cameras and/or sensors that can at least provide images and sensor data to generate a 3D model or map sufficient to determine routes for autonomous driving at low velocities.

In some implementations, the vehicle 100 may be operated in whole or in part by a human driver, or alternatively may comprise an autonomous or semi-autonomous vehicle, for example in which vehicle control (including acceleration, deceleration, braking, and/or steering) is automatically planned and executed by a control system 102 of the vehicle 100, in whole or in part. In addition, the vehicle 100 may be operated by a human at certain times and via automated control at other times. Thus, the vehicle 100 includes one or more functions that may be controlled automatically via the control system 102 to provide driver assistance features including autonomous low velocity driving including with a trailer 170 when being used.

Also, the example vehicle 100 includes a body 118 that is arranged on a chassis 116 and has a longitudinal central axis. The body 118 substantially encloses other components of the vehicle 100. The body 118 and the chassis 116 may jointly form a frame. The vehicle 100 also includes a plurality of wheels 112 each rotationally coupled to the chassis 116 near a respective corner of the body 118 to facilitate movement of the vehicle 100.

A drive system 110 is mounted on the chassis 116, and drives the wheels 112, for example via front and/or rear axles 114. The drive system 110 provides a propulsion system. In certain example implementations, the drive system 110 comprises an internal combustion engine and/or an electric motor/generator, coupled with a transmission thereof. In certain implementations, the drive system 110 may vary, and/or two or more drive systems 110 may be used. By way of example, the vehicle 100 also may incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, an electric motor, and so forth.

By some forms, the vehicle 100 also may include a braking system 122 and a steering system 108. In example implementations, the braking system 122 controls braking of the vehicle 100 using braking components that are controlled via inputs provided by a driver (e.g., via a braking pedal in certain implementations) and/or automatically via the control system 102. Also in example implementations, the steering system 108 controls steering of the vehicle 100 via steering components (e.g., a steering wheel 109 that is part of a steering column coupled to the axle 114 and/or the front wheels 112) that are controlled via inputs provided by a driver (e.g., via the steering wheel 109 in certain implementations) and/or automatically via the control system 102.

By one approach, the control system 102 is coupled to the braking system 122, the steering system 108, and the drive system 110. In various implementations, the control system 102 at least facilitates the generating and processing of captured image data from vehicle cameras 130 or sensor data from detection sensors 132 and other sensors 134 for the vehicle 100 and/or for other vehicles to detect an environment or area near or around the vehicle 100. In addition, in certain implementations in which the vehicle 100 is an autonomous or semi-autonomous vehicle, the control system 102 also provides in certain circumstances control over automated features of the vehicle 100 (including automated operation of the braking system 122, the steering system 108, and/or the drive system 110), including using the image data and the sensor data to generate one or more 3D or 2D digital models or maps.

As depicted in FIG. 1, in various implementations, the control system 102 includes a sensor array 120, a display 124, a transceiver 126, and the controller 140. By one example, the sensor array 120 includes one or more of the cameras 130 (such as video cameras and/or still image cameras). Also in some examples, the sensor array 120 may also include one or more other detection sensors 132 (e.g., radar, sonar, light detection and ranging (LiDAR), infrared, or the like) and/or other sensors 134 (e.g., vehicle position sensors, speed sensors, accelerometers, gyroscopes, inertial sensors, braking sensors, steering sensors, inertial measurement units (IMUs), and so on).

In various implementations, the vehicle cameras 130 used to obtain images of the environment or area near the vehicle 100 may include front, rear, side, and/or surround-view cameras including wide angle, 360 degree, and/or fish-eye lens cameras, as well as monocular, stereo, infrared, time-of-flight, thermal, LiDAR, cameras, and so forth. These cameras 130 may capture images that may be subsequently registered or stitched to images from the remote device 104 (or camera) and then processed by object detection algorithms as well as 3D or 2D modeling or digital mapping algorithms described below to understand the environment or area around a vehicle. By one example, the digital map is used to plan a projected path through the environment or area near the vehicle for autonomous driving. Other details are provided below. In various implementations, video camera images are obtained. Additionally or alternatively, still camera images may be obtained. It should be noted that the form of the digital map disclosed herein may include any digital map data and not necessarily a completed map. Thus, this may include features or image data extracted from images (such as data of corners, edges, etc. or any other feature, and may include data indicating recognized objects and so forth) or other data that is to be used to construct (or reconstruct) the completed digital map). Thus, the digital map may or may not already be in the form of data of the completed digital map.

In various implementations, the detection sensors 132 and/or other sensors 134 obtain additional information as to the environment around a vehicle including an area the vehicle or trailer is to be moved into at low velocity. This information also may include operational data including current position, speed, deceleration and/or acceleration thereof, and so on for use in operating the vehicle 100, for example in accordance with autonomous operation of the vehicle 100 and/or of certain components thereof. This particularly may include radar sensors, ultrasonic, and other types of sensors as well as the inertial measurement units (IMUs) that can detect the motion and orientation of a vehicle.

By one example form, and rather than using cameras 130 alone to detect objects, the cameras 130 are used as part of an advanced driver assistance system (ADAS) or similar system that uses both optics and the other detection sensors 132 and other sensors 134 to detect significant irregular shapes on the road or area the vehicle is to move to. Thus for example, data collected from camera images, radar, LiDAR, and ultrasonic sensors can be used together to detect objects in addition to roadway or parking lot surfaces, such as vehicle barriers, unexpected objects (such as a tire or other debris sitting in the way of the vehicle), and so forth. This may include performing sensor fusion and machine learning or neural network models that receive input from a variety of sensors rather than image data alone, as well as other techniques.

In the present example, the vehicle 100 also includes the transceiver 126 with an antenna 128 to communicate with remote systems, servers, devices, modules, or units, and particularly with remote device 104 and optionally with a remote system 106 in one example. The transceiver 126 may be used to communicate with remote device 104, and when provided the remote system 106, via any suitable network 129 including cellular, 5G, wide area network (WAN), Internet, satellite, personal area network (PAN), local area network (LAN), or short range networks such as Bluetooth, and/or other computer network.

Any one or more parts or components (or units) of the control system 102 and/or controller 140 may perform processing for any of the operations described herein related to image and sensor data processing including for images received from the remote device 104, determining a path for the vehicle 100 or trailer 170, and autonomously driving the vehicle 100, and in turn trailer 170, along the path. Specifically, in various implementations, the controller 140 (and, in certain implementations, the control system 102 itself) is disposed within the body 118 of the vehicle 100. In one implementation, the control system 102 is mounted on the chassis 116. In certain implementations, the controller 140 and/or control system 102, parts of, and/or one or more components thereof may be disposed outside the body 118, for example on a remote server, in the cloud, or other device where image processing is performed remotely, and otherwise as described as being on or off of the vehicle 100 as described herein. It will be appreciated that the control system 102 and/or the controller 140 may otherwise differ from the implementation depicted in FIG. 1. For example, the controller 140 may be coupled to, or may otherwise utilize, one or more remote computer systems, such as remote system 106, and/or other control systems, for example as part of one or more of the above-identified vehicle 100 devices and systems.

Also, the control system 102 may have a display 124 on the vehicle 100 that can provide messages to occupants of the vehicle 100, such as one option that may provide an augmented view of a projected path within an area near the vehicle to permit the occupant or driver to move the vehicle along the path while looking at the display for guidance, or to watch the path or the vehicle move along the path when the vehicle is moved autonomously. The display 124 may be any that can provide a screen for an occupant or user in the vehicle to see the images on the display 124. Such a display 124 may be a digital display, a graphical user interface (GUI), an LED display, a plasma display, an LCD display, an organic light emitting diode (OLED) display, a thin-film transistor (TFT) display, heads up display (HUD), 3D displays, holographic displays, virtual or augmented reality displays, and so forth.

In various implementations, the controller 140 is coupled to the sensor array 120, as well as to the braking system 122, the steering system 108, and the drive system 110. In various implementations, the controller 140 also is coupled to the display 124 and the transceiver 126.

In various implementations, the controller 140 comprises, or is, a computer system, and includes the at least one processor 142, the memory 144, an interface 146, a storage device 148, and a computer bus 149. In various implementations, the controller (or computer system) 140 obtains sensor data from the sensor array 120, and in certain implementations additional data via the transceiver 126. In various implementations, the controller 140 processes the sensor data, including images of a projected path of the vehicle 100 or trailer 170. In certain implementations, the controller 140 also uses the sensor and camera image data for developing, training, and/or implementing one or more autonomous driving models for the vehicle 100 (e.g., for automated control of the braking system 122, steering system 108, and/or drive system 110). In various implementations, the controller 140 provides these and other functions in accordance with the processes and implementations of FIGS. 2-14 and as described further below in connection therewith.

In the depicted implementation, the controller 140 (or computer system) includes at least one processor 142 to perform the computation and control functions of the controller 140, and may comprise circuitry or circuits that form any type of processor or multiple processors, single integrated circuits such as a microprocessor, or any suitable number of integrated circuit devices and/or circuit boards working in cooperation to accomplish the functions of a processing unit. This may include a System on a chip (SoC) and one or more processor cores, and/or shared hardware circuits such as with a central processing unit (CPU), digital signal processor (DSP), and so forth. Otherwise, dedicated or specific function processors may be provided that operate neural networks and other structures for image processing and autonomous driving for example, such as with Application-Specific Integrated Circuits (ASICs), Field-Programmable Gate Arrays (FPGAs), Neural Processing Units (NPUs), graphical processing units (GPUs), image signal processors (ISPs), and so forth. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2-14 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, cache, and flash). In certain examples, the memory 144 is located on and/or co-located on the same computer chip as the processor 142. In the depicted implementation, the memory 144 stores the above-referenced programs 150 along with one or more databases 155 (e.g., pertaining to image processing and/or autonomous driving as described herein) and other stored values (S.V.) 156.

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one implementation, the interface 146 obtains the various data from the sensor array 120 and/or other navigation systems. The interface 146 can include one or more network interfaces to communicate with other systems or components.

The storage device 148 can be any suitable type of storage apparatus, including various different types of direct access storage and/or other memory devices. In one example implementation, the storage device 148 comprises a program product from which memory 144 can receive the program 150 that executes one or more implementations of the processes and implementations of FIGS. 11A-11B and as described further below in connection therewith. In another example implementation, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this example implementation is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 140 may also otherwise differ from the implementation depicted in FIG. 1, for example in that the computer system of the controller 140 may be coupled to or may otherwise utilize one or more remote computer systems and/or other control systems.

Figure 2:
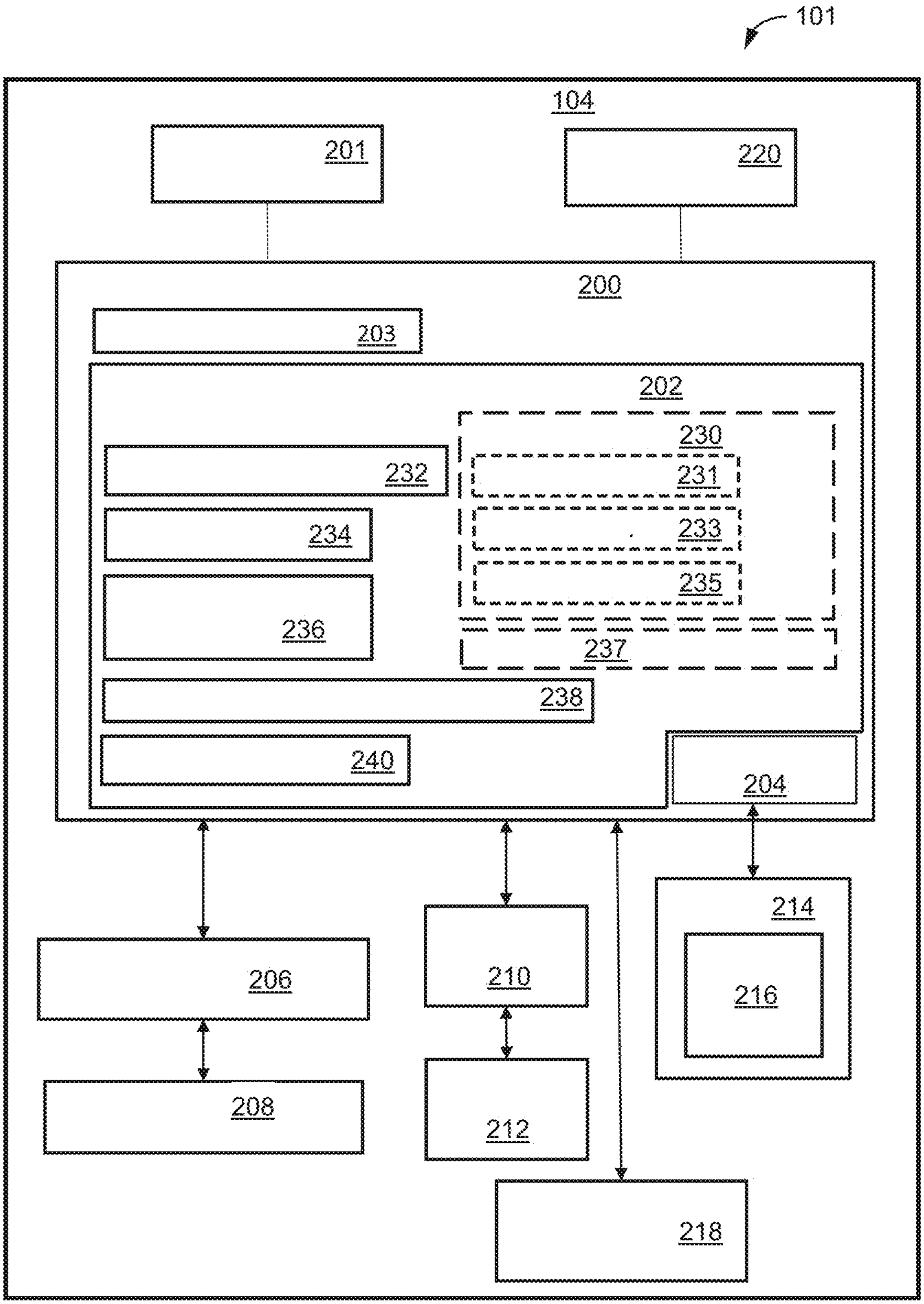
FIG. 2 is a schematic diagram of an example remote device of the system of FIG. 1 and according to at least one of the implementations herein.

Referring for now to FIG. 2, the remote device 104 (or imaging device or camera or camera device) has at least one or more cameras 201 to provide images of an area to be driven into by the vehicle at a low velocity, and from a different perspective than the cameras 130 on the vehicle 100. By one example form, at least the images from the remote device 104 are used to form a 3D or 2D digital map (or model) of the area, although by some of the examples described herein, images from both the remote device 104 and the vehicle cameras 130 are used to form the map. The cameras 201 may be any of the types of cameras as described for cameras 130 above. Sensors 220 on the remote device may provide sensor data to further localize the remote device and other objects within a field of view of the cameras. The types of available sensors are described above with sensors 132 and 134 of the vehicle 100, and here may include at least a LiDAR sensor system, an IMU, and global positioning system (GPS) as one example.

The remote device 104 also may have a display 214 to display an image 216 such as a 3D augmented view of the area near the vehicle that may be augmented with a projected path for the vehicle to follow into the area.

By one example form, the remote device 104 can be any suitable computing device or mobile display device including a smart phone or mobile tablet, but may alternatively be a computer, laptop, Internet of Things (IoT) devices, smart wearables such as smart glasses, smart watches, smart clothing, smart headphones, and so forth as long as the remote device has at least one camera and a display sufficient to perform the operations disclosed herein. This includes any of these devices having a touch screen.

The remote device 104 may have logic units or modules 200 held in a memory 208, one or more processors 206 to operate the logic units 200 and other units on the remote device 104, a transceiver 210 and antenna 212 to receive or transmit image data, projected path data, and other data between the remote device 104, the vehicle 100, and when provided, the remote system 106. The remote device 104 also may include at least one user interface 218 so that a user can respond to images on the display 214. The logic units 200 may at least have a display control 204 for controlling the display 214, an image processing unit 203 to perform pre-processing on raw image data from the cameras 201 when the cameras 201 do not provide such pre-processing, and a remote low velocity vehicle maneuvering system (RLVVMS) 202 to perform many of the remote operations described herein.

The RLVVMS 202 may have at least a path and motion display unit 232, a motion control unit 234, an obstacle instructions and response unit 236, a remote device movement instructions unit 238, a remote light control unit 240, and optionally a 3D reconstruction unit 230 that itself optionally may have a feature extraction unit 231, an object recognition unit 233, and a 3D (or 2D) modeling unit 235. Alternatively, the 3D reconstruction unit 230 may be a separate unit or part of a different unit than the RLVVMS 202. Also as some alternatives, a path generation unit 237 may be provided as well. The details of the operation of these units are provided below. Also, any number (or all) of the optional units may be provided by the vehicle 100 or remote system 106 instead, as described below.

The circuitry and components that form the hardware, firmware, and software (or any combination thereof) of the components of the remote device 104 are already described with the description of the circuitry and components of similar components of the vehicle 100 including, for some examples, the circuitry and components forming processors 206 and the memory 208. The processors 206 and memory 208 may have similar or the same architecture as the processors 142 and memory 144 described above and need not be described again here. It should be noted that any of the logic or functional units, modules, and so forth disclosed herein may have a different configuration than that shown in the figures and still perform the operations described herein.

Referring again to FIG. 1, the optional remote system 106 may be used when processing loads and/or transmission bandwidths are too large for the processors at the vehicle 100 and remote device 104 to handle alone. In this case, the remote system 106 may be, or may include, one or more servers, computers, laptops, desktops, and/or mobile devices such as tablets, smartphones, and so forth, and this may include cloud-based servers. In this regard, the remote system 106 may be realized as a remote information technology (IT) or control center, or otherwise as a maintenance or software update data center or a distributed network of remote control centers that reside at geographic locations that are separate and distinct from one or more edge computing systems that communicate directly with the controller 140 or control system 102 on the vehicle 100 and/or the remote device 104.

The remote system 106 may have a communications unit 184 with an antenna 182 to communicate over the network 129 with the vehicle 100 and/or remote device 104, a controller 180 with one or more processors 186, and memory 188 storing one or more programs 190. These units may have the same or similar hardware, firmware, and software configuration as already described above with those similar units on vehicle 100 and need not be described again. Remote system 106 may receive and transmit data related to operating one or more programs 190 with one or more components, units, or modules of an RLVVMS, similar to the RLVVMS 202 residing at the remote device 104. The distribution of the operations of a base vehicle (or local) low velocity vehicle maneuvering system (LLVVMS) on the vehicle 100, the RLVVMS 202 on the remote device 104, and an RLVVMS on the remote system 106 when present, is described in detail below as well.

Figure 3:
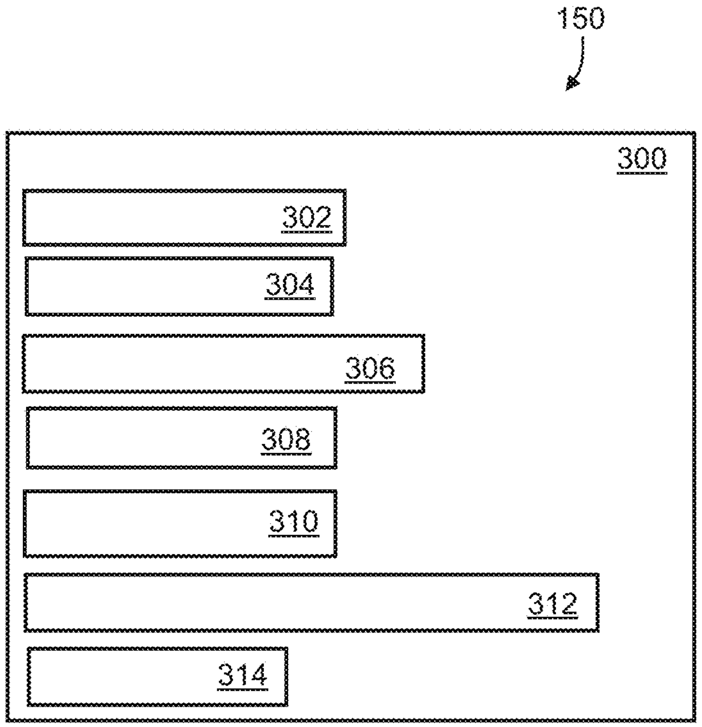
FIG. 3 is a schematic diagram of an example local low velocity vehicle maneuvering system at a vehicle according to at least one of the implementations herein.

Referring to FIG. 3, an example LLVVMS 300 that forms one or more of the programs 150 (FIG. 1) has a 3D (or 2D) reconstruction unit 302 to combine (or register or stitch) image data from the vehicle 100 and the remote device 104 to form a digital map such as a 3D model or map of the area that the vehicle 100 (and/or trailer) is to move into. For the examples herein including any disclosed by FIGS. 1-14, it is assumed that a reconstruction unit 302 generates a 3D model for path projection. However, it will be appreciated that instead of a 3D model, the 3D reconstruction unit 302 may be considered (or includes) a 2D reconstruction unit 302 when a 2D model or map is desired rather than or in addition to a 3D model or map. In the 2D example, either detection of potential obstacles (described below) is performed adequately in 2D or is omitted altogether when it is sufficient to assume that the user of the remote device will stop motion of the vehicle for any obstacles undetected by the disclosed system as one possible example. The LLVVMS 300 also has a path generation unit 304 to generate the projected path into the area. A path and motion display unit 306 generates the path data needed to display an augmented view 1338 of the projected path on the remote device 104 (or alternatively or additionally, on the vehicle display 124 as well). A motion signaling unit 308 handles instructions for moving the vehicle (and in turn a trailer if present) and received from the remote device 104. An object detection unit 310 detects potential obstacles along the projected path and generates inquiries to determine the identification of the obstacles and to be provided to users of the remote device. This unit also may perform path modifications depending on the identification of the obstacles. Otherwise, a remote device movement instructions unit 312 may issue instructions to a user of the remote device 104 to reposition (or otherwise adjust) the remote device 104 to provide more useful image data from the remote device 104. Also, a light control unit 314 may be provided to control the lights on the vehicle when lights on the remote device 104, vehicle 100, and/or trailer 170 are to be used to assist with localization of the remote device relative to the vehicle 100 position and/or the area. The details of the operation of the LLVVMS 300, the RLVVMS 202, and RLVVMS of the remote system 106 are described in detail below with process 1100 (FIGS. 11A-11B).

First, however, it will be appreciated that many different network or processing arrangements may be used in a variety of different network setups and including variations as to which of the system 101 components (vehicle 100, remote device 104, and/or remote system 106) will manage which operations including those modules or units that perform any of the processing mentioned above. Thus, these setups of FIGS. 4-10 as well as process 1100 (FIGS. 11A-11B) may use one or more units of the LLVVMS 300 and/or RLVVMS 202 described above and may have a similar or same label as with systems 300 and 202. Twelve available example alternative arrangements are described as follows with FIGS. 4-10, but it will be appreciated that many others may be used instead.

Figure 4:
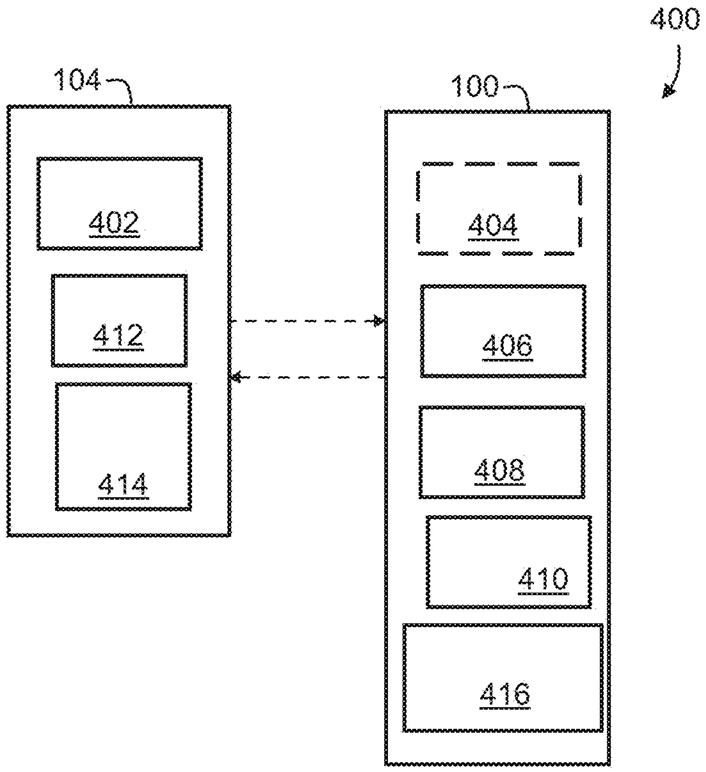
FIG. 4 is a schematic diagram of an example alternative network for a system of low velocity vehicle maneuvering using a remote device according to at least one of the implementations herein.

Referring to FIG. 4, a network setup (or arrangement) 400 connects the vehicle 100 and the remote device 104, where the vehicle 100 optionally has one or more cameras 404 that may be used to capture images of the area to be traveled into by the vehicle 100 and/or trailer 170 at low velocity, a 3D reconstruction unit (or 2D reconstruction unit) 406 to generate a digital model such as a 3D (or 2D) model (hereinafter it will be assumed a 3D model is generated), a path generation unit 408 to project a projected path into the area, a display data unit 410 to generate path data having augmented images of the area with graphics of the virtual projected path shown on the augmented images. The augmented images are provided to the remote device 104 to display the augmented images. The vehicle 100 also includes an autonomous unit 416 to autonomously drive the vehicle 100 along the projected path when instructions are received from the remote device 104 to execute the instructions. It should be noted that anywhere herein where it is mentioned that the vehicle 100 is driven or moved into the area, and when the vehicle has a trailer 170, this statement includes the vehicle 100 moving or driving the trailer 170 into the area alone, or both the vehicle 100 and 170 are both moved into the area.

In this arrangement 400, the vehicle 100 performs the image processing to generate the map and the path generation. The remote device 104 performs minimal image processing. Thus, the remote device 104 has one or more cameras 402 to capture images of the area in a perspective different than the perspective of the area form the vehicle's cameras 404. The raw images (or raw data of the images) may be pre-processed, such as mosaicing, denoising, and other quality or formatting compatibility processing, and then are transmitted to the vehicle 100 for full image processing to generate the 3D model or 3D map of the area. The remote device 104 then displays the augmented images received from the vehicle 100 on a display 412 (which may be referred to or include a display device or display control). A user interface is associated with the display 412, such as a touch screen on the display 412. The user interface may be considered as part of a motion control unit (or more precisely a motion control interface) 414 that uses the touch screen to establish a dead man's switch by one example and to receive motion instructions from the user of the remote device 104 as described elsewhere herein. The motion control interface 414 then sends the motion instructions to the vehicle 100 to autonomously move the vehicle along the displayed projected path.

Also as mentioned herein, the remote device may receive instructions from the vehicle 100 to move the remote device to capture images with a better view of the area, and/or instructions to display an inquiry about a potential obstacle along the projected path or whether to include an area now visible from remote images that were previously occluded. The remote device 104 may transmit obstacle identification (or annotations) to the vehicle 100 as well. The path generation unit 408 also may use radar, sonar, hitch angle detection, and wheel speeds obtained from the vehicle's own sensors, as well as Lidar data from the remote device 104 to localize the remote device 104 relative to the vehicle 100 and the area. The autonomous unit 416 may drive the vehicle 100 according to the commands in the received instructions and by controlling the steering, throttle or accelerator (or engine torque), brakes, and so forth. More details are provided with the description of system 101 above and process 1100 below. Many of these operations just described are the same for the remaining alternative network arrangements and need not be described again.

Figure 5:
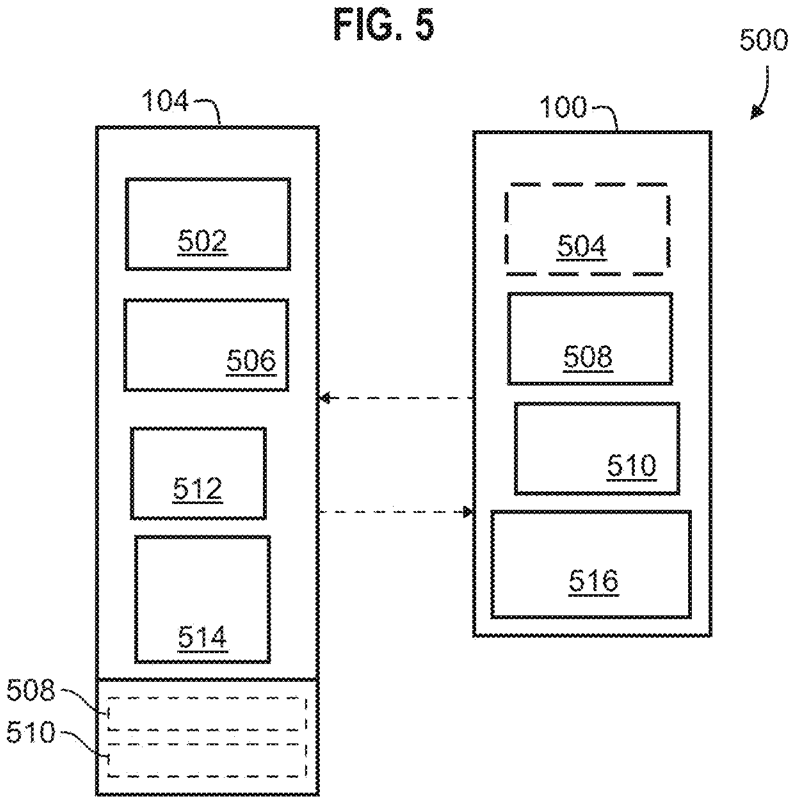
FIG. 5 is a schematic diagram of another example alternative network for a system of low velocity vehicle maneuvering using a remote device according to at least one of the implementations herein.

Referring to FIG. 5, a network setup 500 includes the vehicle 100 and remote device 104 with the same or similar units as with network setup 400 such that the labels are the same and need not be described again except that in this example of network setup 500, the 3D global reconstruction is entirely performed at the remote device 104 instead of the vehicle 100. In this case, the vehicle 100 transmits image data to the remote device 104 to generate a global 3D model or map of the area at the remote device 104. Data of the 3D model is then transmitted to the vehicle for path generation by the path generation unit 508 to be used to generate the projected path on the global 3D map or model of the area. The display data unit 510 at the vehicle 100 still generates augmented images to transmit back to the remote device 104 for display of a projected path and to generate vehicle motion instructions as described above. In this example, raw images captured at the vehicle 100 are transmitted to the remote device 104 instead of the transmission of the raw images from the remote device 104 to the vehicle 100.

By another example, the vehicle 100 performs at least some image processing. It should be noted that the vehicle performing a task more precisely refers to one or more processors of the controller or control system at the vehicle performing the task for any examples herein. The image processing at the vehicle 100 may include feature extraction, object recognition, and/or local 3D modeling of the area only with images captured at the vehicle and to transmit image data including the features, objects, and/or vehicle-local 3D model to the remote device 104 to construct a global 3D model of the area at the remote device 104. This may be performed to reduce the heavy loads of transmitting the raw image data, or to accompany the raw image data.

By yet another option, the vehicle 100 may have the global 3D reconstruction unit 506, while the remote device 104 may have the path generation unit 508 and display data unit 510 instead of the above arrangement. This setup with path generation at the remote device 104 may be used when more efficient or providing better quality images or accurate autonomous driving than with the path generation at the vehicle 100. In such an arrangement, the remote device 104 receives the global 3D map data from the vehicle 100 and has a navigation application that is the type used by autonomous driving or advanced driver assistance systems (ADASs), and may receive sensor data in addition to the image data from the vehicle to perform the path generation.

For yet a further option as shown, the remote device 104 may perform the heaviest image processing load, and the vehicle merely provides the raw image data of the vehicle cameras and sensor data. In this case, the remote device 104 also has the path generation unit 508 and the display data unit 510. The remote device 104 need not provide image data, sensor data, and so forth to the vehicle 100. All of the operations with regard to the placement of the remote device 104, path generation, augmented views, obstacles, and so forth are performed at the remote device 104. The remote device 104 still provides driving instructions to the autonomous unit 516 so that the autonomous unit 516 can autonomously move the vehicle 100 along the projected path.

Figure 6:
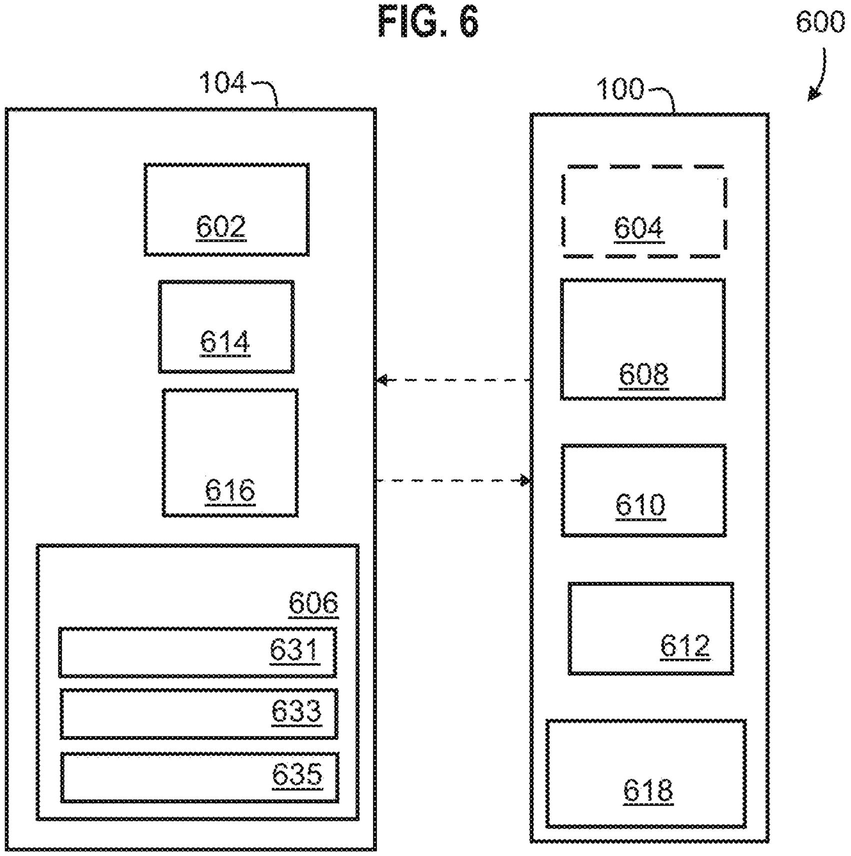
FIG. 6 is a schematic diagram of yet another example alternative network for a system of low velocity vehicle maneuvering using a remote device according to at least one of the implementations herein.
Figure 7:
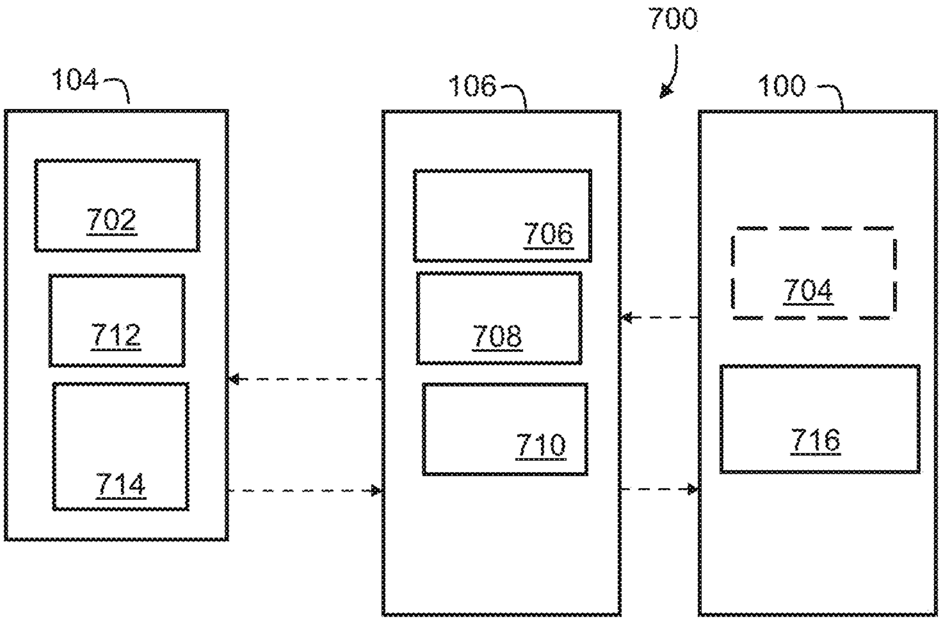
FIG. 7 is a schematic diagram of a further example alternative network for a system of low velocity vehicle maneuvering using a remote device according to at least one of the implementations herein.

Referring to FIG. 6, a network setup (or arrangement) 600 is similar to the network setup 400, except here the remote device 104 performs at least some image processing to avoid transmitting raw image data (or to accompany the raw image data). The vehicle 100 may or may not have cameras 604 in this example. Thus, the remote device 104 in this case has a remote image-based 3D reconstruction unit 606 that has a feature extraction unit 631, an object recognition unit 633, and/or a remote local 3D modeling unit 635. The 3D modeling unit may provide data of 3D models of the area using only the images from the remote device 104. Any of these intermediate stages (features, objects, and/or remote local 3D model) of image data may be transmitted to the vehicle for global 3D model or map generation instead of raw image data as described above.

By some examples, the remaining network setups of FIGS. 7-10 include the remote system 106. Specifically referring now to FIG. 7, a network setup (or arrangement) 700 has the vehicle 100, remote device 104, and remote system 106. In this example, the remote system 106 does most of the image processing including the global 3D modeling or mapping, the path generation, and the generation of the display data. The image processing at the remote device 104 and vehicle 100 is minimal. Specifically, the vehicle 100 has the vehicle cameras 704 and the autonomous unit 716. The remote device 104 has the remote cameras 702, the display unit 712, and the motion control unit 714. The remote system 106 has the global 3D reconstruction unit 706, the path generation unit 708, and the display data unit 710. The operations of these units are as described above with the other arrangements as well as systems 101, 202, and 300. Thus, in this example, a cloud server or other type of server or remote computer may perform the image processing as the remote system 106 to reduce the computation loads at both the remote device 104 and the vehicle 100. The vehicle 100 provides raw image data (and sensor data when being used) and receives autonomous driving instructions either directly from the remote device 104 or via the remote system 106. The remote device 104 provides raw image data to the remote system 106, displays augmented images with a view of the projected path from the remote system 106, and then provides driving instructions and other data in response to the augmented images.

Figure 8A:
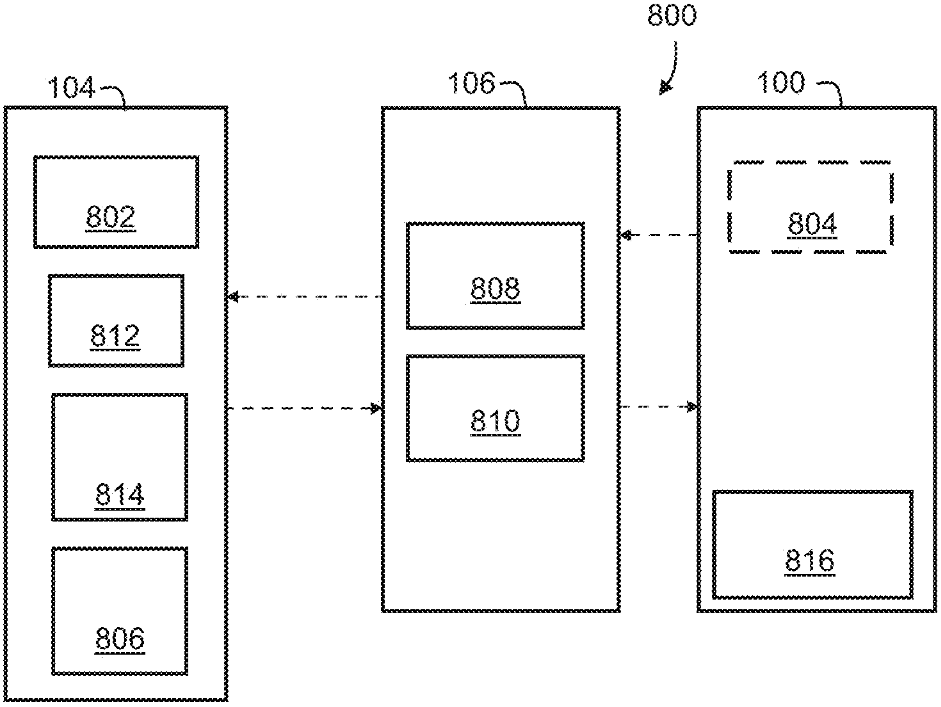
FIGS. 8A to 8C are schematic diagrams of yet further example alternative networks for a system of low velocity vehicle maneuvering using a remote device according to at least one of the implementations herein.

Referring to FIG. 8A for yet another example, a network setup 800 has the same or similar arrangement as network setup 700 with the same or similar units numbered similarly. Now, however, the remote system 106 still has the path generation unit 808 and the display data unit 810, while the remote device 104 has the global 3D reconstruction unit 806. The vehicle 100 may or may not have cameras 804 in this example. Thus, in this example, the 3D reconstruction processing is at the remote device 104, while the path generation and augmented view generation remains at the remote system 106. The vehicle 100 provides raw image data (and sensor data), and receives driving instructions for the autonomous unit 816. Thus, the raw image data from the vehicle 100 may be provided directly or indirectly to the remote device 104 in this example.

Figure 8B:
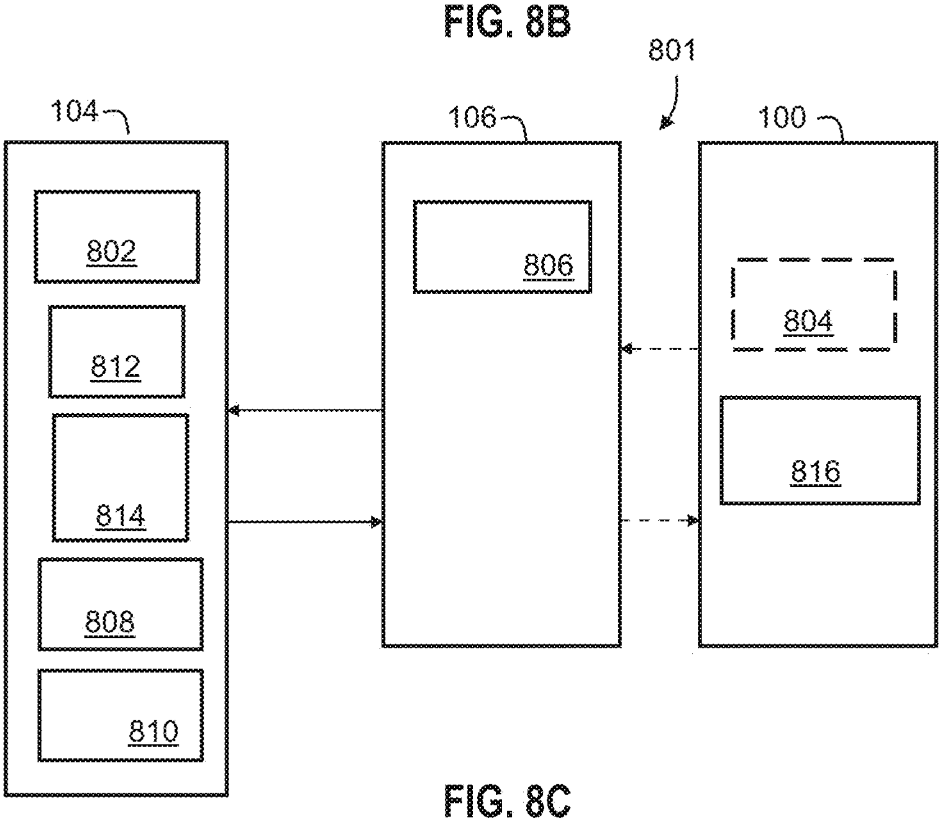

Referring to FIG. 8B for yet another approach, in a setup 801 the remote device 104 has the path generation unit 808 and the display data unit 810, while the remote system 106 has the Global 3D reconstruction unit 806. The vehicle 100 in this example may or may not have cameras 804 but still merely provides image and sensor data and receives autonomous driving instructions.

Figure 8C:
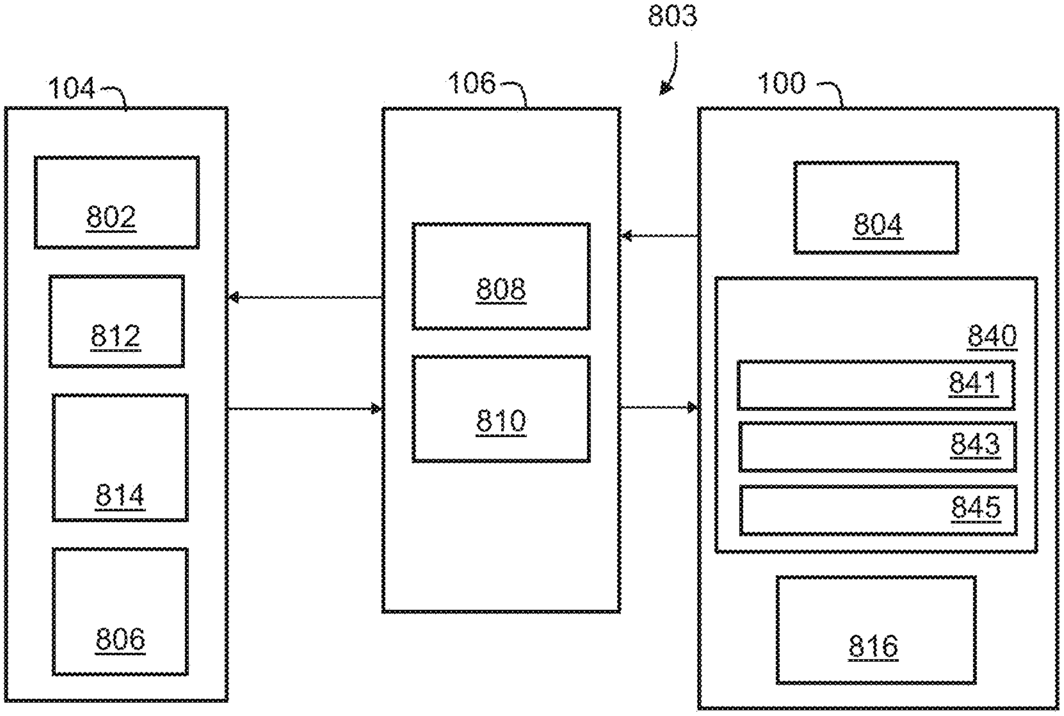

Referring to FIG. 8C for another variation of setup 800, in a setup 803 the vehicle 100 may provide a local image-based 3D reconstruction unit 840 with intermediate levels of detail from units 841, 843, and 845 of image data rather than the raw image data and as described already with the 3D reconstruction unit 606 of network setup 600 (FIG. 6). Here, the vehicle 100 may perform local 3D reconstruction based on the vehicle images only that is later combined with the remote image data at the remote device 106. This combination may alternatively occur at the remote system 106 as in setup 801 (FIG. 8B).

Figure 9:
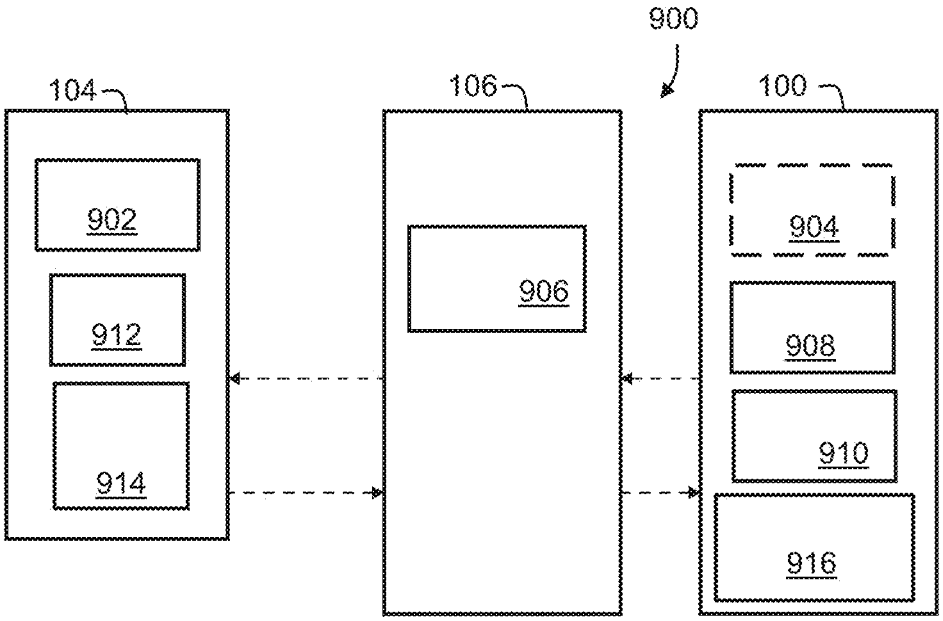
FIG. 9 is a schematic diagram of an example optional network for a system of low velocity vehicle maneuvering using a remote device according to at least one of the implementations herein.

Referring to FIG. 9 for yet another example, a network setup 900 has the same or similar arrangement as network setup 700 with the same or similar units numbered similarly. Now, however, the remote system 106 still performs the global 3D reconstruction with a global 3D reconstruction unit 906, while the path generation unit 908 and the display data unit 910 remain at the vehicle 100. Thus, in this example, much of the image processing remains at the remote system 106 while the autonomous navigation operations of the path generation unit 908 remains together with the ADAS or autonomous unit 916 at the vehicle 100. Thus, the remote device 104 and vehicle 100 still both provide the raw image data to the remote system 106.

By one other option here, the path generation unit 908 and display data unit 910 may remain on the remote system 106, while the global 3D reconstruction unit 906 is on the vehicle 100 to perform the global 3D image processing.

Figure 10:
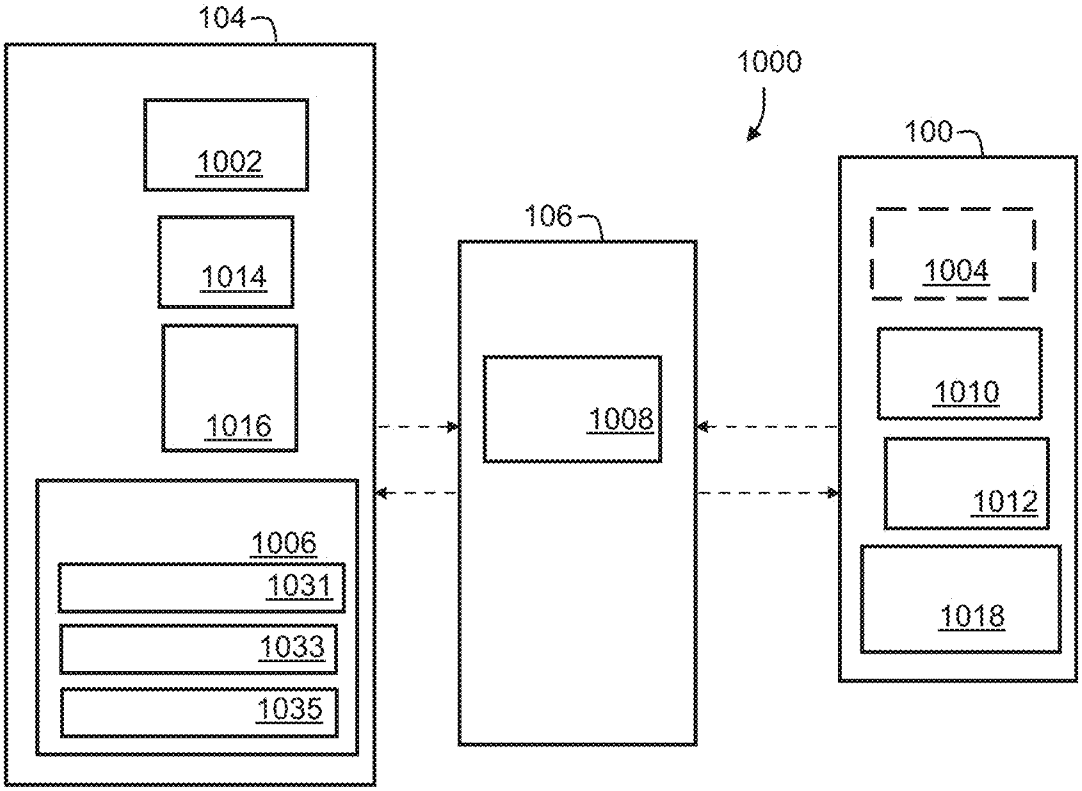
FIG. 10 is a schematic diagram of yet another example optional network for a system of low velocity vehicle maneuvering using a remote device according to at least one of the implementations herein.
Figure 11A:
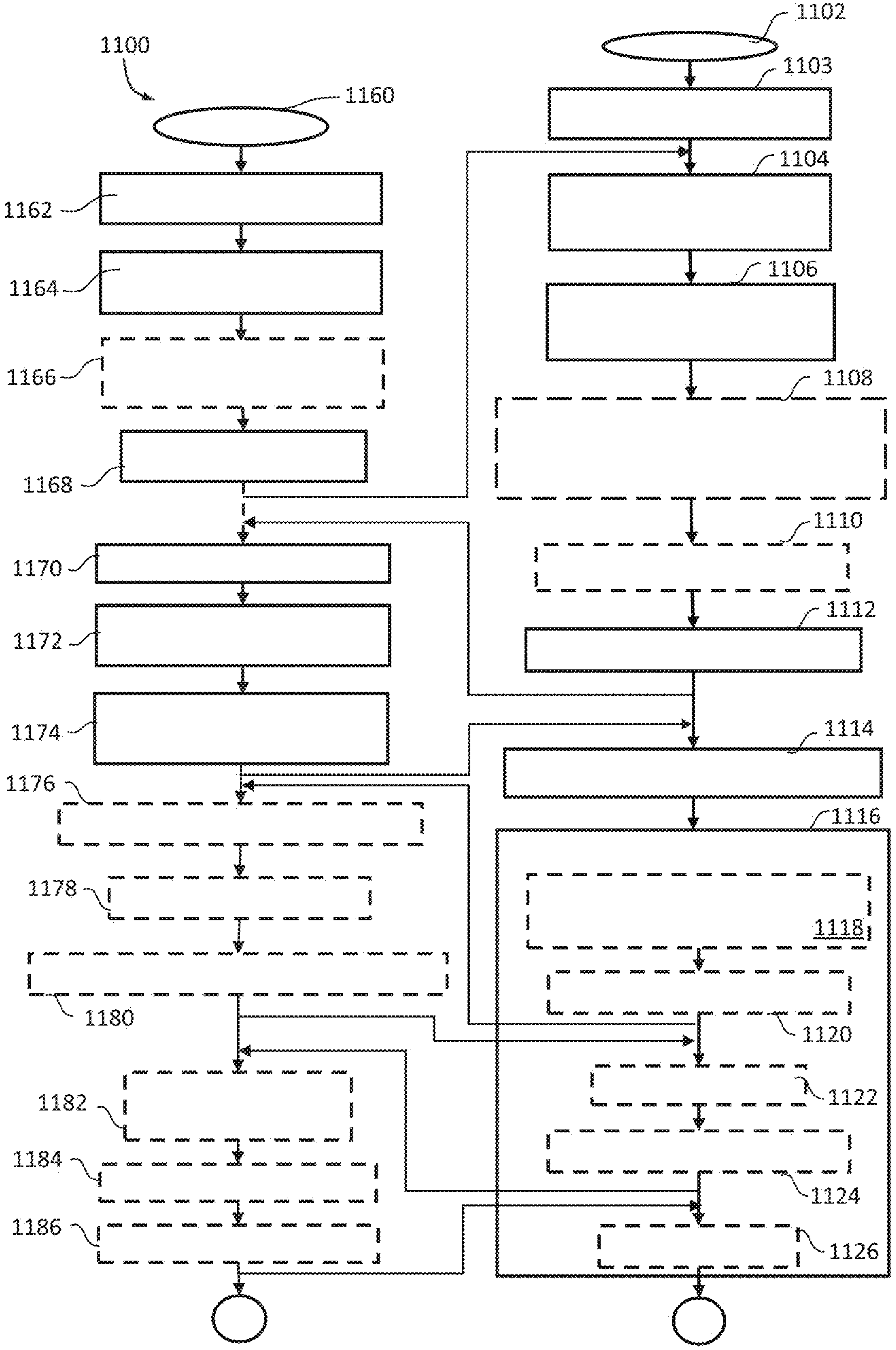
FIGS. 11A-11B is an example flow chart of a low velocity vehicle maneuvering method using a remote device according to at least one of the implementations herein.
Figure 11B:
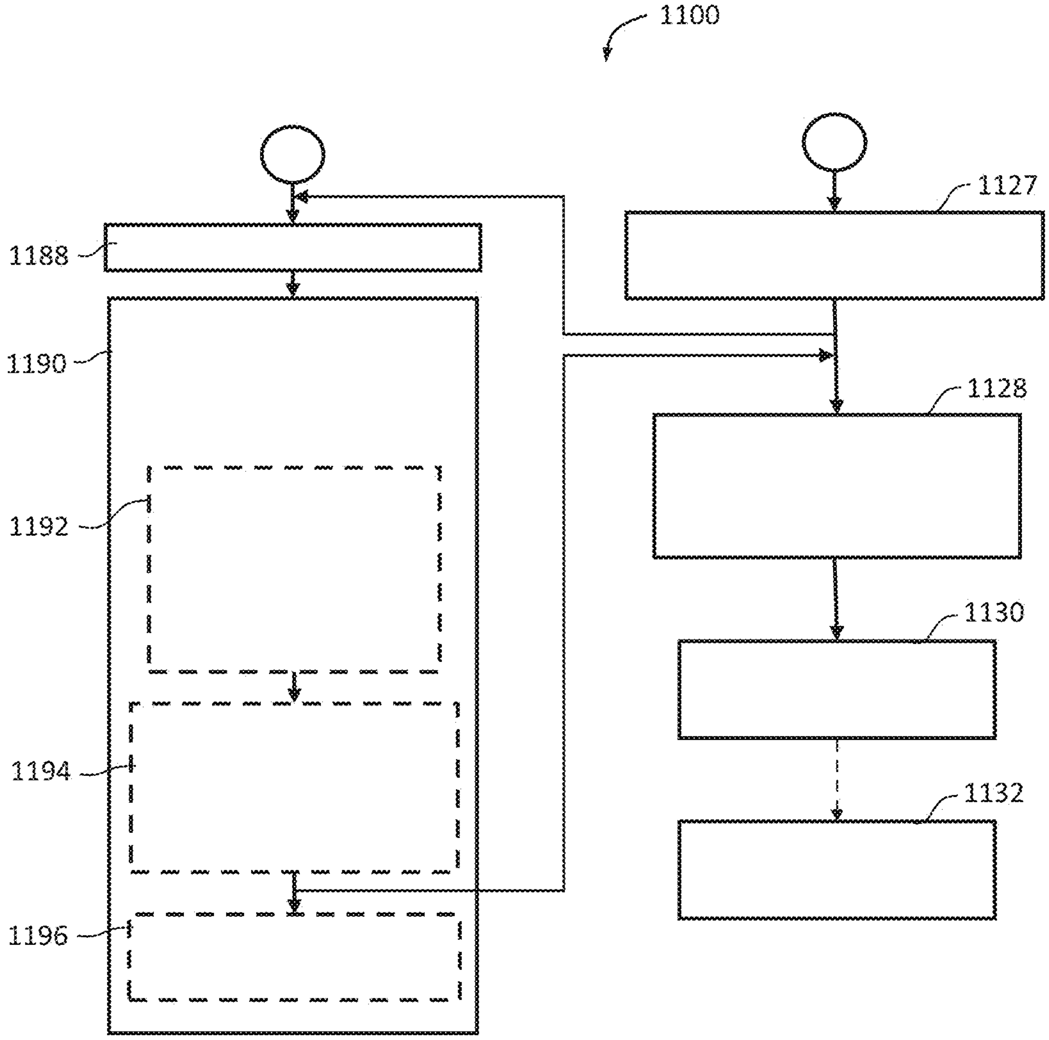
Figure 12:
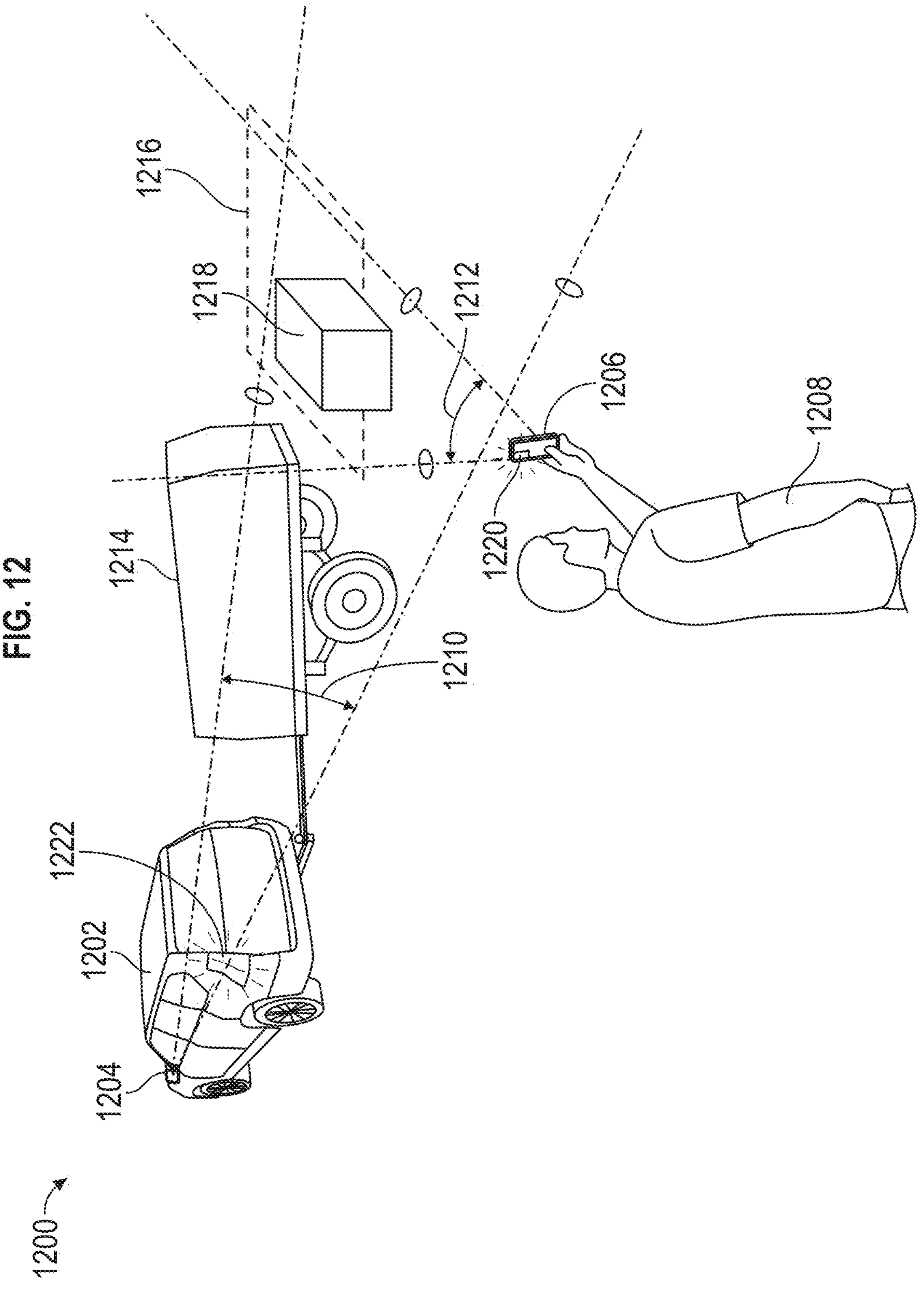
FIG. 12 is a schematic diagram of a perspective view of a vehicle maneuvering setup according to at least one of the implementations herein.

Referring to FIG. 10, a network setup (or arrangement) 1000 has a more equal image processing load distribution among all three main components. In this arrangement 1000, the units are the same or similar to network setup 900 where like numbers indicate the same or similar units or functions, and need not be described again here. In this network setup 1000, however, the remote device 104 does not provide raw image data alone. Instead, the remote device 104 has the remote image 3D reconstruction unit 1006, similar to the 3D reconstruction unit 606, and that generates extracted features, recognized objects, and/or a remote local 3D model or map based on remote images from the remote device 104, and then provides this data to the global 3D reconstruction unit 1008 at the remote system 106 to generate the full global 3D model or map of the area. The vehicle 100 still generates the projected path and augmented display data as with network setup 900.

Referring to FIGS. 11A-11B, an example process 1100 of low velocity vehicle maneuvering is provided according to at least one of the implementations described herein. The example process 1100 is described with operations 1102-1132 generally numbered evenly that are performed at the vehicle 100 (or 1102), while operations 1160 to 1196 generally numbered evenly are performed at the remote device 104 (or 1160) in this example. The systems, vehicles, devices, and components of FIGS. 1-10 and 12-14 may be referred to where relevant.

In this example, the system setup or arrangement 400 (FIG. 4) of system 101 uses a vehicle 100 that may or may not have a trailer 170, and the remote device 104 without using a remote system 106. As explained above, this is merely one example for operating the system 101 (FIG. 1), and other examples may be used instead when desired including those that use a remote system 106 such as a cloud server as described with arrangements or network setups 700 (FIG. 7), 800, 801, 803 (FIGS. 8A-8C), 900 (FIG. 9), and 1000 (FIG. 10). Thus, in this example process 1100, a vehicle 1102 may be operating the local low velocity vehicle maneuvering system (LLVVMS) 300 (FIG. 3), while a remote device 1160 may be operating the RLVVMS 202 (FIG. 2). In the present example, the remote device 1160 is a smartphone with one or more cameras 201.

As to the details of process 1100, the process 1100 may include "activate system" 1103 at the vehicle and "activate system" 1162 at the remote device. By one form, the LLVVMS 300 is activated automatically as soon as the vehicle is turned on. Otherwise, a driver at the vehicle 1102 manually activates the LLVVMS 300 by contacting an activator such as a physical switch or button, or virtual activator on a graphical user interface (GUI) on a display 124 in the vehicle 1102. Upon receiving an activation signal from any of these events, the LLVVMS 300 may immediately initiate visual monitoring of the environment or area near the vehicle that the vehicle is to drive into. This may include simply collecting image data when the cameras 130 of the vehicle 1102 are already monitoring for autonomous driving, always on mode, or other driving mode such as moving in reverse.

By one example, a particular low velocity setup or situation 1200 (FIG. 12) is to be used to explain process 1100, the vehicle 1102 (or 100) is the same as a vehicle 1202 that has a trailer 1214 (or 170) and that is to be moved in reverse into an area 1216, and which may be a parking space. It should be noted that although the area 1216 is shown to be within a border rectangle in dash line on the ground in arrangement or situation 1200, the area 1216 is a 3D area that includes the space above the ground, and herein generally above and within the dashed border rectangle. Otherwise, the area does not have a precise definition except generally as an area to be driven into by the vehicle 1202. The activation as mentioned above may cause vehicle cameras 1204 here shown on a sideview mirror of the vehicle 1202 to activate and create a field of view 1210 between vehicle field-of-view lines (VFLs) where the area 1216 is at least partly within the field of view 1210. In this example, however, the trailer 1214 blocks at least part of the view 1210 of the area 1216 so that the autonomous driving system (or ADAS) cannot adequately determine a path into the area 1216.

When this occurs, the LLVVMS 300 may issue an alert to use a remote device to capture more of the area 1216 in images from the remote device. When a single person is in the vehicle 1202, the person or driver may place the vehicle in park, exit the vehicle, and manually activate an RLVVMS 202 application (or herein just app) on the remote device 1160 for operation 1162. The remote device 1160 (and 104) is the same as remote device 1206 here. Alternatively, the LLVVMS 300 at the vehicle 100 may remotely and automatically activate the RLVVMS 202 app on the remote device 1206 when needed. The driver then points the remote device 1206 toward the area 1216 to capture more of the area 1216, and in one form at least part of the area 1216, here where the area 1216 is behind the trailer 1214 and relative to the vehicle 1202.

The cameras 201 of the remote device 1206 then may establish a field of view 1212 between remote field-of-view lines (RFLs) with at least part of the area 1216 is within the field-of-view 1212 and by one form, so that the captured images from the remote device 1206 at least partially overlap the capture images from the vehicle's cameras, although such overlap need not always exist.

Referring again to FIG. 11A, process 1100 continues below in one example chronological order including operations at both the remote device 1160 and the vehicle 1102, although it will be appreciated that a different order of operations may be used than that explained below.

Starting at the remote device 1160, process 1100 may include "capture images near vehicle" 1164, and by remote device cameras 201. This also may include capturing sensor data such as LiDAR and IMU data indicating a position and orientation of the remote device 104. This operation may include capturing raw image data and may include performing pre-processing, whether by the camera itself or a separate unit or module, and such as demosaicing, denoising, scaling, color scheme conversion (such as from RGB to YUV), and so forth particularly when encoders and decoders are to be used to transmit the image data, and any other expected pre-processing to place the image data in a format expected at the vehicle 100.

Optionally, process 1100 may include "preform remote image processing" 1166, and this may include further performing any of the local operations mentioned above whether feature extraction, object recognition, and/or remote local 3D modeling of the area before combining the data of the images from the remote device (the remote images) with the images from the vehicle cameras (the vehicle images). The optional 3D reconstruction unit 230 may perform this remote local image processing for example.

Process 1100 may include "transmit image data" 1168. Thus, the remote device 104 transmits its camera feed, and as mentioned may involve using an encoder at the remote device 104 and a decoder at the vehicle 100. The transmission may include any of the data stages mentioned or formats mentioned above including raw image data, extracted features, recognized objects, and remote local 3D models or maps. For features and objects, this may include the position, dimensions, orientation, and identification of an object when known, and so forth. The transmission also may include the sensor data mentioned, as well as status information of the remote device 104 including for example position and orientation data separate from the sensor data, status of cameras, memory, processing load, and so forth.

At the vehicle, process 1100 may include "receive image data from remote device" 1104, and by use of a decoder for the image data. The image data and other received data may be extracted from a bitstream for example, and placed in memory or buffers for immediate use. The image data may be time stamped, which are maintained and used to maintain a frame rate to transmit augmented image data back to the remote device 104 so that the augmented views appear to display in real time or near real time from the perspective of the user of the remote device 104. The image and other data is then received by (or is made accessible to) the global 3D reconstruction unit 302 (FIG. 3).

Otherwise, the LLVVMS 300 at the vehicle 100 may continuously monitor the bitstream or data stream from the remote device 104. The communication channel receiving the data from the remote device 104 should have minimum parameters to ensure the real time or near real time communication is maintained not only to present a realistic situation in the augmented images and to a user, but to better ensure understanding of an up-to-date situation at the vehicle to provide safe autonomous driving.

Process 1100 may include "receive image data from vehicle cameras" 1106, and as explained with the remote images above. Pre-processing and storage as well as any desired encoding and decoding to transmit data among components of the system 300 may be performed for the vehicle images as well.

Optionally, process 1100 may include "include images of vehicle light flash, remote light flash, or both for relative localization" 1108. In this alternative, the lights on either or both of the vehicle 100 and remote device 104 may be used to assist with localizing both the vehicle 100 and the remote deice 104 relative to each other and the area. Referring to FIG. 12 again, the light control unit 314 (FIG. 3) may operate one or more lights 1222, here being a rear brake light, on the vehicle 1202, while the remote light control unit 240 (FIG. 2) operates one or more lights 1220 on the remote device 1206. The lights 1220 and 1222 may be controlled to be visible in the images of the opposite cameras. In other words, the vehicle light 1222 is controlled to be visible in the remote images, while the remote device light 1220 is controlled to be visible in the vehicle images. By one form, this may include blinking the lights at desired predetermined or random intervals or some other temporal pattern including leaving the lights on continuously or depending on some other trigger, such as when the vehicle is moving. The position of the lights in the images may be used to localize the position and orientation of the remote device 1206 and vehicle 1202 relative to each other since the position and orientation of the vehicle and remote device relative to their respective lights will be known. Triangulation and other techniques then may be used to determine the position of the lights using the images showing the lights. This operation also may provide a safety feature that indicates the remote and vehicle systems are in sufficient synchronization as described herein to operate the vehicle autonomously, and in this case, the lights may be operated only while such synchronization exists.

Also optionally, process 1100 may include "receive other sensor data" 1110, and this may include receiving any sensor data from the vehicle's own sensors whether the sensor data provides imaging of the area, vehicle, and/or remote device, detection data of the environment around the vehicle, vehicle position and/or orientation data, and vehicle component status data as described above with sensor array 120 (FIG. 1). Otherwise, this may include receiving sensor data from the remote device 1160 such as LiDAR, GPS, and/or IMU data to name some examples. Finally, this operation 1110 also may include receiving a signal from a separate locator such as a virtual key module on a vehicle key fob typically carried by a user of the remote device, or the remote device itself may have an application that acts as a key fob of the vehicle. This signal may be used to locate the user, and in turn provide some confirmation of the remote device location. Other external devices may be used in this way instead of, or in addition to, a FOB.

Process 1100 may include "perform 3D reconstruction" 1112. By one example form, the reconstruction may be performed by using the remote images from the remote device 1160 alone (or with other non-camera sensor data). In the present example, however, the 3D reconstruction involves registering or stitching the remote images and the vehicle images together to form a digital map that is a global 3D model or map of the area (or which may be a 2D map or modeling instead as mentioned above). By one form, this may include image processing, sensor fusion, and vehicle localization, and may be performed by the various networks mentioned above. The present example of process 1100 uses the network setup 400 (FIG. 4) where the 3D reconstruction unit 302 of the LLVVMS 300 at the vehicle 1102 (or 100) performs the 3D reconstruction.

By one example approach, the 3D reconstruction is performed by using real-time monocular 3D reconstruction. By one example monocular process, this may involve continuous image capture and the cameras may be considered, or used as, monocular cameras. Feature detection (or extraction) and matching of features between different remote and vehicle images of the area taken at the same time as well as feature matching consecutively (or temporally) then may be performed and that match key features such as corners or edges in the image for example. Features across consecutive frames are matched to estimate camera motion and motion of objects in the images over time. The feature matching may be performed by using algorithms such as Scale-Invariant Feature Transform (SIFT), Oriented Features from Accelerated Segment Test (FAST) and Rotated Binary Robust Independent Elementary Features (BRIEF) (cooperatively ORB), or Speeded-Up Robust Features (SURF)). Thereafter, camera pose estimation may be used to position and orient the camera relative to the area, and may include using Visual Odometry (VO) or Simultaneous Localization and Mapping (SLAM) techniques. Depth estimation then may be performed to infer depth information for each pixel of an image, and this may be performed by using structure from motion (SfM), and neural networks trained to perform direct depth estimation via deep learning models like Monodepth or MiDaS. Next, point cloud generation is performed by using the depth data to generate a sparse or dense point cloud representing the 3D geometry of the area. Then, mesh reconstruction can be used to convert the point cloud into a 3D mesh using triangulation techniques (e.g., Delaunay triangulation). Texturing then may be applied by mapping original image textures onto the 3D mesh to enhance realism thereby completing the current 3D model or map of the area. The 3D map then may be rendered in real time or near real time as described below. The 3D map may be continuously updated as images from the vehicle 1102 and the remote device 1160 are obtained. Thus, the 3D reconstruction process may be iterative as images are added to 3D model. It will be appreciated that this is one example process to perform the 3D reconstruction and others can be used instead.

Additionally, object recognition may be used to identify objects in the area and to enhance the 3D modeling algorithms used herein. This may include using object recognition algorithms based on any one or more algorithms of: machine learning, neural networks, Convolutional Neural Networks (CNNs), Region-Based Convolutional Neural Networks (R-CNN), Recurrent Neural Networks (RNNs), Mask R-CNNs, You Only Look Once (YOLO), Single Shot MultiBox Detector (SSD), Semantic Segmentation such as Fully Convolutional Networks (FCNs) and U-Nets, for example, Haar Cascades (Viola-Jones (VJ) Detector), Histogram of Oriented Gradients (HOG), MOG (Mixture of Gaussians) background subtraction, SIFT, SURF, template matching, DPM (Deformable Parts Model), GMM (Gaussian Mixture Model) background subtraction, LDA (Linear Discriminant Analysis), and/or many others.

This operation also may include generating initial images of the 3D model to be displayed on the remote device 1160 in order to receive a location of an end destination for the vehicle 1102 and/or trailer 170 (or 1214) in the area. This may involve real time rendering of initial images of the 3D map by matching the current first person view (FPV) perspective of the remote device to a perspective of the area in the 3D map, and the initial images may be updated continuously (including at some predetermined interval) to appear to be real time, and where the perspective changes as the remote device and vehicle move and in turn move their respective cameras. At this point, the initial images are not necessarily augmented images yet since the projected path is not constructed yet (although other augmentation could be provided on the images such as instructions or highlighting of the vehicle and so forth). The 3D reconstruction unit 302 than may have the initial images prepared for transmission to the remote device, such as with encoding, and then transmitted. This operation optionally also may provide overhead images to the remote device 1160.

For other approaches, and as mentioned above, the remote device 1160 may provide feature extraction data, object recognition, data, and/or 3D models of the area captured in the remote images before combination with the vehicle images, and instead of, or in addition to, use of raw image data from the remote device 1160. In this example, the 3D reconstruction unit 302 adds the data from the remote device at the appropriate level being analyzed. Thus, the extracted features are added to the features extracted from the vehicle images, and so forth. When a remote local 3D (or 2D) model is provided, the remote local 3D model is combined or absorbed into the vehicle 3D model by adding the data into the correct place in the 3D reconstruction process mentioned above as one example. With this arrangement, the remote images are used to fill in obscured or missing sections of the area whether raw image data, features, objects, or remote local 3D models are obtained from the remote device 1160.

Returning to the remote device 1160, process 1100 may include “display images of 3D map” 1170. Where the initial images are displayed on a display 214 on the remote device 1160. By one alternative, the RLVVMS 202 provides an option to display or toggle between a current overhead view and the FPV perspective.

Process 1100 may include “display inquiry for end destination” 1172, and this may include various directions or indicators to be shown to a user viewing the display 214. This may include displaying the text “touch end destination” or other desired text or symbols on the display 214 that is understood as a direction to indicate the end destination on the displayed view of the area when the display 214 has a user interface such as a touch screen. Otherwise, a mouse, keyboard, or other user interface may be used. When a trailer 170 (or 1214) is present, the end destination may indicate a location (such as a rear end) of the trailer rather than the vehicle itself or either.

Thus, process 1100 may include “obtain end destination from user interface” 1174 where the location on the display, and in turn on the area, indicated by the user is obtained by the remote device 1160 and transmitted back to the vehicle 1102. This may be in the form of pixel (or other image or 3D map) coordinates as well as an identification of the image used for the identification. Otherwise, data of the identified image may be transmitted as well.

Returning again to the vehicle side, process 1100 may include “determine initial end destination” 1114, where the location of the end destination is extracted or placed on the identified image, and then converted into 3D coordinates on the 3D map. This may be performed by the 3D reconstruction unit 302 or the path generation unit 304. Again, this may be in 2D instead or in addition when desired.

By yet another alternative, however, the 3D reconstruction unit 302 does not transmit initial images. Instead, images captured by the remote device 1160 alone are shown to the user to receive a selection of the end destination in the area. The image used for the selection and the location of the selection are transmitted to the vehicle 1102. In this case, the 3D reconstruction unit 302 or the path generation unit 304 match the identified image from the remote device to a matching perspective of the 3D map (or in other words, the location of the remote device 1160 relative to the area), and then reconstructs the location of the end destination on the 3D map from the matching perspective.

Once the end destination is obtained, process 1100 may include "generate path to end destination" 1116, and operation 1116 may include "determine if images provide sufficient field of view" 1118. By analyzing the 3D map, the remote device movement instructions unit 312 can determine if certain sections of the area are still missing or obscured by observing the data forming the 3D map. The remote device movement instructions unit 312 (or other unit 302 or 304) also may determine that the 3D map is insufficient when initiating triangulation algorithms to position objects on the 3D map and there is insufficient 3D map data to complete the computations.

In this case, operation 1116 also may include "send motion inquiry if not" 1120, where the remote device movement instructions unit 312 initiates transmission of the directions to move the remote device 1160, and to the remote device 1160, that should provide a field-of-view of the remote cameras to cover the missing or obscured section of the area in the 3D map. As one example, this may include the instruction "move your phone 1.0 feet to your right" as one possible example. The instruction or direction is then transmitted for display to the user and to the remote device 1160.

Then at the remote device 1160, process 1100 may include "receive camera motion inquiry" 1176, and "display motion inquiry" 1178. By one example, the remote device movement instructions unit 238 displays or overlays the instructions on the current view of the area on the remote device 1160, or the instructions may be displayed as a separate page on the display 214 that returns to the view of the area after the separate page with the direction was displayed for a minimum amount of time. Many variations are contemplated.

Process 1100 may include "capture images with new perspective" 1180 by cameras 201, where once the remote device 1160 is moved, new remote images are captured from the new FPV perspective, and these new images, or the intermediate level image data of features, objects or remote local 3D model, are then transmitted to the vehicle 1102.

This returns operations to the vehicle side where process 1100 may include "identify obstacles" 1122. Now, the object detection unit 310 analyzes the 3D map and determines whether unidentified objects exist between a current position of the vehicle (or trailer if present) and the end destination in the area that are potential obstacles along the path. By one form, the location of the potential obstacles are determined where the object detection unit 310 identifies a 3D relative position of the remote device 1160 while the vehicle sensors provide data that identifies an angle to the object (or potential obstacle). The remote device 1160 identifies an angle to the object. Then by combining the angular information, a relative position of the object can be identified as well as the shape, dimensions, and when relevant, the orientation of the object. Referring again to FIG. 12, a position, shape, dimensions, and orientation of a potential obstacle 1218 may be generated by using the operations mentioned above.

If such a potential obstacle exists, the remote device movement instructions unit 312 initiates transmission of an inquiry and process 1100 may include "send obstacle inquiry if so" 1124. The inquiry may be in the form of an image of the area with a visual augmented emphasis of the potential obstacle whether by highlighting, different colors, shading, and so forth on images being sent to the remote device 1160 for display. The inquiry also may include text such as "identify highlighted object" or other desired text that directs the user of the remote device 1160 to respond in a certain way to provide the identification of the object. By another form, this may include an inquiry as to whether to include (or in other words, is available for the vehicle to enter) an area now visible from remote images that were previously occluded.

This returns operations to the remote device where process 1100 may include "receive obstacle inquiry" 1182 and "display obstacle inquiry" 1184. This is received by the obstacle instructions and response unit 236 on the remote device 1160. In this obstacle mode, the image is displayed on the display 214 with the emphasis of the obstacle as mentioned. The text instructions may be displayed as well, and as mentioned. The user may be provided with specific instructions as to how to identify the object, or it may be intuitive such as by providing a text box known to the user to be used to type text within the box. Otherwise, the user may be provided instructions before use of the present methods. The user may be provided instructions to enter expected language to provide a typical name of an object to be avoided (e.g., box, guardrail, tree, shopping cart, curb, parking block, wheel stop, construction barrier, etc.). The systems 300 and 202 will know to avoid these objects by use of a database and neural network to match the responses to known responses and corresponding corrective actions, for example although many different algorithms may be used. The annotation from the user also may include instructions to ignore the object when relevant (e.g., "oil stain on ground-ignore").

Process 1100 next may include "receive annotations" 1186, and from the user and on the remote device 1160. This text annotation or contextual information then may be added to the images near the obstacle or otherwise stored as additional data, such as with metadata for a particular image, or as separate accompanying data that identifies the corresponding image with the emphasized obstacle. By one form, the obstacle may be the vehicle's own trailer 170, and the obstacle mode may include determining or confirming the position, orientation, and dimensions of the trailer.

Back at the vehicle 1102, process 1100 then may include "form path data" 1126, and by the path generation unit 304. The path generation unit 304 reads and understands obstacle annotations to ignore an obstacle or form a projected path into the area that avoids the obstacle and, by one example, by using a database and neural network (or other algorithm) as mentioned above. The path generation unit 304 uses that as a factor in the path generation. Also when a trailer is present, the algorithms analyze the 3D (or 2D) model to determine a path for the vehicle that results in movement of the trailer along a desired path into the area. This may be considered a single path or two separate paths with one path for the vehicle and one path for the trailer that may not be the same and may not be colinear or parallel. Thus in this case, the path data includes both the directions or path to move the vehicle as well as the expected resulting path of the trailer. Any of this data may be transmitted to the device to display a projected path, such as to the remote device 1160. Thus, the path data may include any motion plan data whether instructions on the route or trajectory to be followed, instructions to control vehicle systems, or anything else used to provide instructions to move the vehicle. However in one example form, when only the trailer path is to be displayed to a user, then only the trailer path data may be transmitted to the remote or other displaying device. The vehicle path data (to in turn move the trailer) may be kept at the vehicle to be used once autonomous driving instructions are received as explained below. It also will be appreciated that herein the target path may be the same as a projected path, and may be a path for either the vehicle or the trailer (or both) depending on the context. Other variations may be used instead.

Projected path planning for autonomous or ADAS driving can be achieved using a variety of algorithms designed to efficiently determine safe and efficient predicted paths. Among these are A* (A-star), which is widely used for finding the shortest path with "guaranteed optimality" in a weighted graph, and *WA (Weighted A-star), which trades off optimality for speed by applying a weight to the heuristic function. Bi-A (Bidirectional A-star) performs two simultaneous searches, one from a start and the other from a goal, to reduce computation time. Any-A* (Anytime A-star) is an iterative algorithm that quickly provides an initial suboptimal solution and improves it over time. D*(Dynamic A-star) is well-suited for dynamic environments, as it allows for path replanning in response to changes in the map. IDA (Iterative Deepening A-star)*combines the memory efficiency of depth-first search with the heuristic advantages of A*, and JPS (Jump Point Search) is an optimization for grid-based maps that reduces the number of nodes expanded by skipping intermediate steps in straight-line movement. These algorithms enable autonomous vehicles to navigate complex and dynamic environments effectively.

As one example, the A* (A-star) pathfinding algorithm combines the strengths of Dijkstra's algorithm and a heuristic approach to efficiently find the shortest path in a weighted graph. It operates by maintaining two lists: an open list of nodes to be explored and a closed list of nodes already evaluated. A heuristic function increases A*'s efficiency, guiding the search towards the goal while balancing the trade-off between exploration and optimality. A* finds the shortest path if the heuristic is admissible (never overestimates the actual cost) and consistent.

As another example, RRT (Rapidly-exploring Random Tree) incrementally builds a tree by randomly sampling the space and extending the tree towards these samples. RRT is particularly effective in high-dimensional spaces where uniform sampling would be computationally expensive. RRT* (RRT Star) improves path quality by using a cost-based rewire process. RRT* ensures asymptotic optimality, meaning it converges to an optimal or best path as the number of samples increases.

Process 1100 may include "transmit path to the remote device" 1127. The path and motion display unit 306 converts the 3D model path data into image data. The path and motion display unit 306 is the same as the display data units 410, 510, 612, 710, 810, 910, and 1010 in FIGS. 4-10. Thus, augmented images are rendered using the most current 3D map data and with the current FPV perspective from the remote device 1160. The augmented images are augmented with a graphical representation of the generated projected path. The augmented images are then transmitted to the remote device 1160.

It will be appreciated that as an alternative, just the augmentation data of the projected path may be transmitted to the remote device 1160 without full image data and includes location data indicating the location of the view of the projected path on the images. The path and motion display unit 232 at the remote device 104 then places the augmentation data of the view of the projected path onto images generated at the remote device in the current FPV perspective.

By yet another alternative, the path data unit and motion display unit 306 (or path data unit) transmits data of the 3D map annotated with object identifications and projected path location, and the remote device 1160 is to generate augmented images showing the projected path at the remote device 1160 by using the global 3D map data. Many variations may be used instead. This also may avoid transmission of raw image data.

In response at the remote device 1160, process 1100 may include "display view of target path" 1188, in any of the cases mentioned above, the augmented images are displayed on the display 214 to show the augmented images to a user of the remote device 1160.

Referring to FIG. 13 for another example, a low velocity setup 1300 shows a covered parking garage 1302 and a remote device 1304, here being a smartphone, using cameras to capture images of a vehicle 1308 on a display 1330 that may be a touch screen. The vehicle 1308 is about to back into a parking space 1306 with lane lines 1320 and 1322 between two other cars 1316 and 1318. An area 1334 near the vehicle 1308 includes the parking space 1306 that is to be entered into by the vehicle 1308. The remote device 1304 shows a view 1336 of the area 1334 in an FPV perspective.

The remote device 1304 may be showing an augmented image 1332 and that shows an augmentation of a projected path 1338 (more precisely a view 1338 of a projected path) that includes a pair of left and right guidelines 1312 and 1314 that may indicate a target wheel path for the wheels of the vehicle 1308, but may correspond to other vehicle components, such as simply the left and right sides of the vehicle 1308. An augmentation arrow 1310 also is provided as part of the projected path 1338 to indicate the direction the vehicle is to travel. The arrow 1310 also may be a part of the view 1336 of the area 1334 that is expected to be touched by a user in order to autonomously move the vehicle along the projected path 1338. It will be appreciated that while the projected path 1338 is shown as solid continuous lines, the guidelines (or parking assist lines, parking guidelines, or reversing guidelines) may be any pattern, shape, or color as desired. The guidelines 1312, 1314 may be static or fixed in position although still change as the remote device 1160 is moved. Otherwise, the guidelines 1312, 1314 may be dynamic and shown to move as the guidelines 1312, 1314 are updated with modifications from the path generation operations in addition to simply movement of the remote device 1160.

The visual appearance of the guidelines 1312, 1314 themselves may be modified and/or other symbology and text may be provided as the vehicle travels along the projected path 1338 such as to change colors as the vehicle moves closer to the end destination. Other augmentation may show the distance still to travel or alerts when other objects appear. Many other variations and additions may be used.

It also should be noted that the projected path 1338 may be provided behind the vehicle 1308 even when a trailer is present. In that case, the projected path may be visible over a view of the trailer. By other alternatives, the generated projected path shows the path of the trailer 170 (or 1214) even though the movement of the vehicle itself is controlled to move the trailer in turn. Also, even though the projected path 1338 is shown to include guidelines and an arrow for the vehicle 1308, the projected path could be provided for the trailer 1214 instead or both the vehicle and the trailer with either a shared projected path or each with their own separate projected path. Other alternatives may be used instead.

Referring to FIG. 14, process 1100 may include "receive command(s) to move vehicle originating from user interface of display" 1190, and received at the remote device from the user. The setup 1400 is the same as setup 1300 except now the user's hands 1402 and 1404 are shown in dashed line and are contacting the augmented image 1332. By one form, the user may hold a finger or other pointer such as a stylus on the arrow 1310 or within the guidelines 1312, 1314 to confirm or accept the projected path 1338 and indicate that the vehicle is to be moved along the projected path 1338. By other alternatives, the user may touch a button whether physical or a graphical user interface on the touch screen 1330 of the remote device 104 to confirm acceptance of the projected path 1338. The contact or touch may be monitored and reported by the motion control unit 234 on the remote device 1160.

Operation 1190 also may include "send dead-man switch move command as long as user is in contact with touch-screen" 1192 in FIG. 11B, and performed by the motion control unit 234. By this example, as long as the user is touching the touchscreen and augmented image either anywhere on the touch screen 1330 or at specification locations on the touch screen 1330 such as within or sufficiently near the predicted or projected path 1338, the vehicle will move autonomously. When the method expects contact within a certain proximity to the projected path 1338 on the augmented image 1332, the maximum distance from the projected path 1338 that is to count as contact herein may be determined and set by experimentation.

Operation 1190 may include "send move command corresponding to motion of user's finger along view of path" 1194, and where the motion control unit 234 initiates transmission of the user's contact with the touch screen 1330 to activate or maintain motion of the vehicle 1102. This includes contact by a pointer such as a stylus or other type of pointer. In this case, and in the example of setup 1400, the vehicle 1102 will be moved along the projected path 1338 and into the parking space 1306 as long as the user's hand 1404, and precisely finger in this example, is moving down the arrow 1310 and remaining in contact with the projected path 1338 on the touch screen 1330. This may be a continuous process sufficiently close to real time to provide continuous safe control of the motion of the vehicle 1102 along the projected path 1338. As soon as the user removes his finger from the projected path 1338 or the touch screen 1330 entirely, the vehicle 1102 will stop moving.

As another alternative feature, operation 1190 may include "animate vehicle moving along the path" 1196. Here, an animated version 1406 (FIG. 14) of the vehicle 1308 is outlined in dashed line, and may be shown moving along the projected path 1338 as the vehicle 1308 is moving along the projected path 1338. The animated version 1406 of the vehicle 1308 may be in many different visual forms, whether see-through or solid, having a realistic appearance or a real image appearance that may or may not be a copy of the actual vehicle 1308 being used, or drawn (or computer animated) appearance. The animation 1406 may be placed over the real image of the vehicle 1308 or may replace the real image of the vehicle 1308 such that the real image is removed from the augmented image 1332. The animation 1406 also may be drawn and changing at the correct perspectives matching the FPV perspectives of the remote images.

Returning to the vehicle 1102, process 1100 may include "receive instructions to autonomously move the vehicle along the path" 1128, where a motion signaling unit 308 at the vehicle 1102 receives the instruction signals. The motion signaling unit 308 may convert the signals into an expected format, code, or language, and provide the instructions to the autonomous unit (such as that shown on FIGS. 4-10) or the control system 102 and/or controller 140 of vehicle 100 to perform the autonomous driving. The autonomous units and the operation of the control system 102 and controller 140 may include the use of any autonomous driving and/or ADAS software or firmware of the programs 150 operated by the control system 102 and controller 140.

Process 1100 may include "execute autonomous driving instructions" 1130, and where the autonomous units, control system 102, and/or controller 140 autonomously drive the vehicle 1102 along the projected path. This may include shifting the vehicle 1102 out of park, placing the vehicle 1102 into reverse gear or drive gear, and steering the vehicle 1102 according to the projected path being used. By one example form, when the user disengages or stops contacting the projected path on the touch screen, the vehicle 1102 may be stopped at a complete stop by initialing applying the brakes, and after a predetermined duration such as three seconds, place the vehicle in park. If the user resumes contact on the touch screen within the three seconds, the motion of the vehicle may resume. Otherwise as another example, when the end destination is reached or when an unexpected obstacle is detected, the process will shift the vehicle back into park and repeat the process.

By other alternatives, control of the vehicle motion being performed by using actuators such as the controls for engine torque, steering, and brakes, may be placed in a local feedback loop with wheel speed sensors, IMU, and perception sensors as one example to have a constant understanding of the status of the vehicle. By one form, the vehicle is to move at 1-2 mph, but may have an upper speed limit of 3 mph. By one form, the autonomous driving is started from a complete stop for the low velocity method herein. This is expected since a driver, user, or passenger will typically exit the vehicle first to begin capturing images of the area with the remote device 1160 of the user.

Process 1100 may include "maintain safety protocol" 1132. By one example protocol, the system 101 detects the following factors are all satisfied before permitting the vehicle to move, and this is monitored continuously. If any one factor is not satisfied, the vehicle will stop, place the vehicle in park, and will restart the maneuvering process. Thus, by this example approach: (1) The user must maintain contact as a dead man switch feature and with the display touch screen on the remote device. This may be replaced with a visible gesture detection factor when desired. (2) A continuously tested communication channel is open with the remote device. (3) The vehicle and/or trailer lights are blinking or turned off and/or on in an expected pattern. (4) A detected distance to the user is monitored (using a smart key fob or other device, such as a key fob application on the remote device) and at a minimum distance from the area when such device is detected and being used. (5) The vehicle speed is not above a predetermined limit such as 3 mph. By one optional form, when all are satisfied, the vehicle may continue to move autonomously along the projected path into the area.

With the arrangements described herein, the disclosed low velocity vehicle maneuvering system can be used to automatically and efficiently reverse a vehicle with a trailer, particularly when the trailer obscures the sensors on the vehicle and the trailer dimensions are not previously known and adding sensors to the trailer is impractical.

Herein, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, any version of words such as "connected" or "coupled" used in describing a relationship between different elements or parts of the systems herein do not imply that a direct physical or communications connection must be made between these elements, unless mentioned otherwise. For example, two elements may be connected to each other physically, electronically, communicatively, logically, or in any other manner, through one or more additional elements.

While at least one example implementation has been presented in the foregoing detailed description, it should be appreciated that a vast number of variations exist. It should also be appreciated that the example implementations are not intended to limit the scope, applicability, or configuration of the disclosure in any way. Rather, the foregoing detailed description will provide those skilled in the art with a convenient road map for implementing the example implementations. It should be understood that various changes can be made in the function and arrangement of elements without departing from the scope of the disclosure as set forth in the appended claims and the legal equivalents thereof.

What is claimed is:

1. A method, comprising:

receiving first image data of first images from at least one camera on a vehicle, wherein the first images include a view of at least one area to be moved into by the vehicle or a trailer hitched to the vehicle;

receiving second image data of second images from at least one camera on a remote device remote from the vehicle, wherein the second images include a view of at least part of the area;

generating, by at least one processor, a digital map of the area comprising using both the first image data and the second image data;

generating, by at least one processor, path data of a projected path of the vehicle or the trailer at least partially through the area on the digital map, wherein the path data is arranged to be used to display a view of the projected path on the remote device;

receiving, by at least one processor on the vehicle, autonomous driving instructions by use of a graphical user interface associated with the display; and executing, by at least one processor on the vehicle, the instructions to autonomously move the vehicle or the trailer along the projected path, wherein the remote device has at least one light, and wherein the at least one processor is arranged to operate by transmitting a signal to the remote device to cause the remote device to activate the at least one light while the first images are being captured; and using one or more of the first images showing the light to locate the remote device to generate the digital map.

2. The method of claim 1, wherein the generating of both the digital map and the path data is performed at the vehicle, and wherein the at least one processor generating the digital map at the vehicle receives at least raw image data from the remote device.

3. The method of claim 1, wherein the digital map is a 3D map, wherein the generating of both the 3D map and the path data is performed at the vehicle, and wherein the at least one processor generating the 3D map at the vehicle receives at least remotely-generated 3D map data of the part of the area in the second image data.

4. The method of claim 1, wherein the generating of both the digital map and the path data is performed at the vehicle, and wherein the at least one processor generating the digital map at the vehicle receives remotely-generated data of identification of features extracted or objects recognized or both in the part of the area in the second image data.

5. The method of claim 1, comprising transmitting the first image data to the remote device, and wherein the generating of the digital map is performed at the remote device.

6. The method of claim 5, wherein the generating of the path data is performed at the remote device.

7. The method of claim 1, comprising transmitting the first and second image data to a remote system that is remote from both the remote device and the vehicle, and wherein the generating of the digital map is performed at the remote system.

8. The method of claim 7, wherein the generating of the path data is performed at the remote system.

9. The method of claim 7, wherein the generating of the path data is performed on the vehicle, and wherein the remote device is a smartphone or a tablet, and the remote system is a server.

10. The method of claim 7, wherein the generating of the path data is performed on the remote device.

11. A system, comprising:

a vehicle having memory, and processor circuitry forming at least one processor at the vehicle and being communicatively coupled to the memory, the at least one processor being arranged to operate by:

receiving first image data of first images from at least one camera on the vehicle, wherein the first images include a view of at least one area to be moved into by the vehicle or a trailer hitched to the vehicle;

receiving second image data of second images from at least one camera on a remote device remote from the vehicle, wherein the second images include a view of at least part of the area;

generating a digital map of the area comprising using both the first image data and the second image data;

generating path data of a projected path of the vehicle or the trailer at least partially through the area on the digital map;

generating augmented views of the area of the digital map with a view of the projected path;

receiving autonomous driving instructions by use of a graphical user interface associated with a display showing the augmented views; and executing the instructions to autonomously move the vehicle or trailer along the projected path, wherein the vehicle has at least one light, and wherein the at least one processor is arranged to operate by:

activating the at least one light when the remote device is capturing the second images, and using the second images showing the light to locate the remote device relative to a location of the vehicle to generate the digital map.

12. The system of claim 11, wherein the at least one processor is arranged to operate by transmitting the augmented views to the remote device, and wherein the display is on the remote device.

13. The system of claim 12, wherein the at least one processor is arranged to operate by receiving the autonomous driving instructions and identification of obstacles in response to transmitting the augmented views.

14. The system of claim 13, wherein the at least one processor is arranged to operate by transmitting an inquiry to the remote device to at least one of: identify a potential obstacle indicated in the augmented views, and whether to include an area that was previously occluded, and transmitting instructions to change the view on the remote device when the digital map is deemed to be insufficient.

15. The system of claim 14, wherein the at least one processor is arranged to operate by determining a location of the remote device relative to the vehicle by using a location signal from at least one of: (1) a key fob of the vehicle and in possession of a user of the remote device or (2) the remote device having an application that acts as a key fob of the vehicle.

16. A vehicle, comprising:

one or more controllers, comprising: memory; and processor circuitry forming at least one processor communicatively coupled to the memory, wherein the at least one processor is arranged to operate by:

receiving first image data of first images from at least one camera on the vehicle, wherein the first images include a view of at least one area to be moved into by the vehicle or the trailer;

receiving second image data of second images from at least one camera on a remote device remote from the vehicle, wherein the second images include a view of at least part of the area;

generating a digital map of the area comprising using both the first image data and the second image data;

generating path data of a projected path of the vehicle or the trailer at least partially through the area on the digital map and by using the digital map to display a view of the projected path on the remote device;

receiving autonomous driving instructions by use of a graphical user interface associated with the display; and executing the instructions to autonomously move the vehicle or the trailer along the path, wherein the vehicle has a trailer hitched to the vehicle and having at least one light, and wherein the at least one processor is arranged to activate the at least one light when the remote device is capturing the second images.

17. The vehicle of claim 16, wherein the at least one processor is arranged to operate by receiving sensor data from non-camera sensors of the vehicle to generate the digital map.

18. The vehicle of claim 16, wherein the remote device has at least one light, and wherein the at least one processor is arranged to operate by transmitting a signal to the remote device to cause the remote device to activate the at least one light while the first images are being captured; and using one or more of the first images showing the light to locate the remote device to generate the digital map.

19. The vehicle of claim 16, wherein the vehicle has at least one light, and wherein the at least one processor is arranged to operate by activating the at least one light when the remote device is capturing the second images; and using the second images showing the light to locate the remote device relative to a location of the vehicle to generate the digital map.

* * * * *